United States Patent
Gupta et al.

(10) Patent No.: US 11,570,771 B2
(45) Date of Patent: Jan. 31, 2023

(54) EVOLVED SEMI-PERSISTENT SCHEDULING FOR WIRELESS COMMUNICATIONS

(71) Applicant: QUALCOMM Incorporated, San Diego, CA (US)

(72) Inventors: Piyush Gupta, Bridgewater, NJ (US); Junyi Li, Chester, NJ (US); Chong Li, Weehawken, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 894 days.

(21) Appl. No.: 16/379,722

(22) Filed: Apr. 9, 2019

(65) Prior Publication Data
US 2019/0320437 A1     Oct. 17, 2019

Related U.S. Application Data

(60) Provisional application No. 62/657,593, filed on Apr. 13, 2018.

(51) Int. Cl.
*H04W 72/04* (2009.01)
*H04L 1/18* (2006.01)
*H04W 76/28* (2018.01)

(52) U.S. Cl.
CPC .......... *H04W 72/0446* (2013.01); *H04L 1/18* (2013.01); *H04W 72/0406* (2013.01); *H04W 76/28* (2018.02)

(58) Field of Classification Search
CPC ......... H04W 72/0446; H04W 72/0406; H04W 76/28; H04L 1/18; H04L 1/1887; H04L 5/0053; H04L 5/0094
See application file for complete search history.

(56) References Cited

U.S. PATENT DOCUMENTS

2017/0265167 A1*  9/2017  Guo .................... H04W 72/042
2017/0303302 A1* 10/2017  Bagheri ............ H04W 72/1289
(Continued)

FOREIGN PATENT DOCUMENTS

| EP | 2296422 A1 | 3/2011 |
| EP | 3038398 A1 | 6/2016 |
| WO | WO-2017052706 A1 | 3/2017 |

OTHER PUBLICATIONS

Gardiner E., "Avnu Alliance™ Best Practices—Theory of Operation for TSN-enabled Systems," Revision 1.0, 2017, 71 pages, retrieved from the URL: http://www.avnu.org.
(Continued)

*Primary Examiner* — Ivan O Latorre
(74) *Attorney, Agent, or Firm* — Qualcomm Incorporated

(57) ABSTRACT

Methods, systems, and devices for wireless communications are described that support evolved semi-persistent scheduling (SPS) for wireless communications. A base station may configure SPS in which multiple time intervals are scheduled, each time interval including multiple slots that may be scheduled by different uplink or downlink resource allocations. The SPS configuration may include an ON-OFF duty cycle where an ON portion of the duty cycle spans a portion of a time interval and includes uplink and downlink resources, and an OFF portion of the duty cycle spans a remaining portion of the time interval and does not include any allocated SPS resources. Such SPS configurations may be used, for example, for transmitting sensor data and command information between controllers and sensors/actuators in a factory automation network.

30 Claims, 16 Drawing Sheets

(56) References Cited

U.S. PATENT DOCUMENTS

2018/0242389 A1* 8/2018 Phuyal .............. H04W 72/1215
2019/0327760 A1* 10/2019 Holfeld ................ H04W 72/04

OTHER PUBLICATIONS

Frotzscher A., et al., "Requirements and current solutions of wireless communication in industrial automation," International Conference on Communications Workshops (ICC), IEEE, 2014, 6 pages.
International Search Report and Written Opinion—PCT/US2019/026834—ISA/EPO—dated May 27, 2019.
Samsung: "General Aspects to Support URLLC in NR", 3GPP Draft; R2-1705601 General Aspects to Support URLLC in NR, 3rd Generation Partnership Project (3GPP), Mobile Competence Centre, 650, Route Des Lucioles; F-06921 Sophia-Antipolis Cedex, France, vol. RAN WG2, No. Hangzhou, China; May 15, 2017-May 19, 2017, May 14, 2017 (May 14, 2017), 6 Pages, XP051275924, Retrieved from the Internet: URL: http://www.3gpp.org/ftp/Meetings_3GPP_SYNC/RAN2/Docs/[retrieved on May 14, 2017].

* cited by examiner

EVOLVED SEMI-PERSISTENT SCHEDULING FOR WIRELESS COMMUNICATIONS

CROSS REFERENCES

The present application for patent claims the benefit of U.S. Provisional Patent Application No. 62/657,593 by Gupta et al., entitled "Evolved Semi-Persistent Scheduling For Wireless Communications," filed Apr. 13, 2018, assigned to the assignee hereof, and expressly incorporated herein.

BACKGROUND

The following relates generally to wireless communications and to evolved semi-persistent scheduling for wireless communications.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support semi-persistent scheduling (SPS) for wireless communications. Various described techniques provide for configuring SPS so that multiple time intervals are scheduled, where each time interval may contain multiple slots for different uplink or downlink resource allocations. Such SPS configurations may provide resources for periodic control and feedback transmissions between a base station and a user equipment (UE) in which one or more downlink transmissions and one or more uplink transmissions may be scheduled within a time interval.

In some cases, the SPS configuration may include an ON-OFF duty cycle where an ON portion of the duty cycle spans a portion of a time interval and may include uplink and downlink resources, and an OFF portion of the duty cycle spans a remaining portion of the time interval and may not include any allocated SPS resources. In some cases, the SPS configuration may provide a number of configured time periods during which the semi-persistent scheduling configuration applies, where a duration of each configured time period is a product of a number of time intervals and a number of slots per time interval. Such SPS configurations may be used, for example, to transmit sensor data and command information between controllers and sensors/actuators in a factory automation network.

A method of wireless communication is described. The method may include receiving, from a base station, a semi-persistent scheduling configuration that includes a set of downlink resources within multiple time intervals and a set of uplink resources within the multiple time intervals, each time interval of the multiple time intervals including multiple slots with different resource allocations, receiving a set of downlink transmissions from the base station via the set of downlink resources, and transmitting a set of uplink transmissions to the base station via the set of uplink resources.

An apparatus for wireless communication is described. The apparatus may include a processor, memory coupled to the processor, and instructions stored in the memory. The instructions may be executable by the processor to cause the apparatus to receive, from a base station, a semi-persistent scheduling configuration that includes a set of downlink resources within multiple time intervals and a set of uplink resources within the multiple time intervals, each time interval of the multiple time intervals including multiple slots with different resource allocations, receive a set of downlink transmissions from the base station via the set of downlink resources, and transmit a set of uplink transmissions to the base station via the set of uplink resources.

Another apparatus for wireless communication is described. The apparatus may include means for receiving, from a base station, a semi-persistent scheduling configuration that includes a set of downlink resources within multiple time intervals and a set of uplink resources within the multiple time intervals, each time interval of the multiple time intervals including multiple slots with different resource allocations, receiving a set of downlink transmissions from the base station via the set of downlink resources, and transmitting a set of uplink transmissions to the base station via the set of uplink resources.

A non-transitory computer-readable medium storing code for wireless communication is described. The code may include instructions executable by a processor to receive, from a base station, a semi-persistent scheduling configuration that includes a set of downlink resources within multiple time intervals and a set of uplink resources within the multiple time intervals, each time interval of the multiple time intervals including multiple slots with different resource allocations, receive a set of downlink transmissions from the base station via the set of downlink resources, and transmit a set of uplink transmissions to the base station via the set of uplink resources.

In some examples of the method, apparatuses, and non-transitory computer-readable medium described herein, the semi-persistent scheduling configuration further includes an ON-OFF duty cycle that spans a set of the multiple time intervals, an ON portion of the ON-OFF duty cycle including one or more uplink resources of the set of uplink resources, one or more downlink resources of the set of downlink resources, or combinations thereof. In some examples of the method, apparatuses, and non-transitory computer-readable medium described herein, the ON portion of the ON-OFF duty cycle spans a first set of slots, and where an OFF portion of the ON-OFF duty cycle spans a second set of slots corresponding to a remaining number of slots of the multiple time intervals that may be outside of the first set of slots.

In some examples of the method, apparatuses, and non-transitory computer-readable medium described herein, the semi-persistent scheduling configuration further includes aggregation information for the multiple time intervals that indicates that the set of downlink resources and the set of uplink resources within each of the multiple time intervals repeats during a configured time period.

In some examples of the method, apparatuses, and non-transitory computer-readable medium described herein, the semi-persistent scheduling configuration further includes a number of configured time periods during which the semi-persistent scheduling configuration applies. In some examples of the method, apparatuses, and non-transitory computer-readable medium described herein, a duration of each configured time period may be a product of a number of time intervals and a number of slots per time interval. In some examples of the method, apparatuses, and non-transitory computer-readable medium described herein, each of the multiple time intervals correspond to scheduled traffic windows, and where each slot of the multiple slots is scheduled by a resource allocation indicating uplink resources, downlink resources, or that no resources may be allocated within the slot.

In some examples of the method, apparatuses, and non-transitory computer-readable medium described herein, one or more of the multiple slots includes an unspecified resource allocation configured for subsequent scheduling. In some examples of the method, apparatuses, and non-transitory computer-readable medium described herein, the one or more of the multiple slots that include the unspecified resource allocation may be available for retransmission.

In some examples of the method, apparatuses, and non-transitory computer-readable medium described herein, the set of uplink resources may be used for transmission of sensor data in a factory automation network and the set of downlink resources may be used at least in part for transmission of command information in the factory automation network. In some examples of the method, apparatuses, and non-transitory computer-readable medium described herein, the set of uplink resources and the set of downlink resources may be used for transmission of control information in a factory automation network.

A method of wireless communication is described. The method may include determining a semi-persistent scheduling configuration for a UE that includes a set of downlink resources within multiple time intervals and a set of uplink resources within the multiple time intervals, each time interval of the multiple time intervals including multiple slots with different resource allocations, transmitting the semi-persistent scheduling configuration to the UE, transmitting a set of downlink transmissions to the UE via the set of downlink resources, and receiving a set of uplink transmissions from the UE via the set of uplink resources.

An apparatus for wireless communication is described. The apparatus may include a processor, memory couple to the processor, and instructions stored in the memory. The instructions may be executable by the processor to cause the apparatus to determine a semi-persistent scheduling configuration for a UE that includes a set of downlink resources within multiple time intervals and a set of uplink resources within the multiple time intervals, each time interval of the multiple time intervals including multiple slots with different resource allocations, transmit the semi-persistent scheduling configuration to the UE, transmit a set of downlink transmissions to the UE via the set of downlink resources, and receive a set of uplink transmissions from the UE via the set of uplink resources.

Another apparatus for wireless communication is described. The apparatus may include means for determining a semi-persistent scheduling configuration for a UE that includes a set of downlink resources within multiple time intervals and a set of uplink resources within the multiple time intervals, each time interval of the multiple time intervals including multiple slots with different resource allocations, transmitting the semi-persistent scheduling configuration to the UE, transmitting a set of downlink transmissions to the UE via the set of downlink resources, and receiving a set of uplink transmissions from the UE via the set of uplink resources.

A non-transitory computer-readable medium storing code for wireless communication is described. The code may include instructions executable by a processor to determine a semi-persistent scheduling configuration for a UE that includes a set of downlink resources within multiple time intervals and a set of uplink resources within the multiple time intervals, each time interval of the multiple time intervals including multiple slots with different resource allocations, transmit the semi-persistent scheduling configuration to the UE, transmit a set of downlink transmissions to the UE via the set of downlink resources, and receive a set of uplink transmissions from the UE via the set of uplink resources.

In some examples of the method, apparatuses, and non-transitory computer-readable medium described herein, the semi-persistent scheduling configuration further includes an ON-OFF duty cycle that spans a set of the multiple time intervals, an ON portion of the ON-OFF duty cycle including one or more uplink resources of the set of uplink resources, one or more downlink resources of the set of downlink resources, or combinations thereof. In some examples of the method, apparatuses, and non-transitory computer-readable medium described herein, the ON portion of the ON-OFF duty cycle spans a first set of slots, and where an OFF portion of the ON-OFF duty cycle spans a second set of slots corresponding to a remaining number of slots of the multiple time intervals that may be outside of the first set of slots.

In some examples of the method, apparatuses, and non-transitory computer-readable medium described herein, the semi-persistent scheduling configuration further includes aggregation information for the multiple time intervals that indicates that the set of downlink resources and uplink resources within each of the multiple time intervals repeats during a configured time period.

In some examples of the method, apparatuses, and non-transitory computer-readable medium described herein, the semi-persistent scheduling configuration further includes a number of configured time periods during which the semi-persistent scheduling configuration applies. In some examples of the method, apparatuses, and non-transitory computer-readable medium described herein, a duration of each configured time period may be a product of a number of time intervals and a number of slots per time interval. In some examples of the method, apparatuses, and non-transitory computer-readable medium described herein, each of the multiple time intervals correspond to scheduled traffic windows, and where each slot of the multiple slots is scheduled by a resource allocation indicating uplink resources, downlink resources, or that no resources may be allocated within the slot.

In some examples of the method, apparatuses, and non-transitory computer-readable medium described herein, one or more of the multiple slots includes an unspecified resource allocation configured for subsequent scheduling. In some examples of the method, apparatuses, and non-transitory computer-readable medium described herein, the one or more of the multiple slots that include the unspecified resource allocation may be available for retransmissions.

In some examples of the method, apparatuses, and non-transitory computer-readable medium described herein, the set of uplink resources may be used at least in part for transmission of sensor data in a factory automation network and the set of downlink resources may be used at least in part for transmission of command information in the factory automation network. In some examples of the method, apparatuses, and non-transitory computer-readable medium described herein, the set of uplink resources and the set of downlink resources may be used for transmission of control information in a factory automation network.

DETAILED DESCRIPTION

Figure 1:
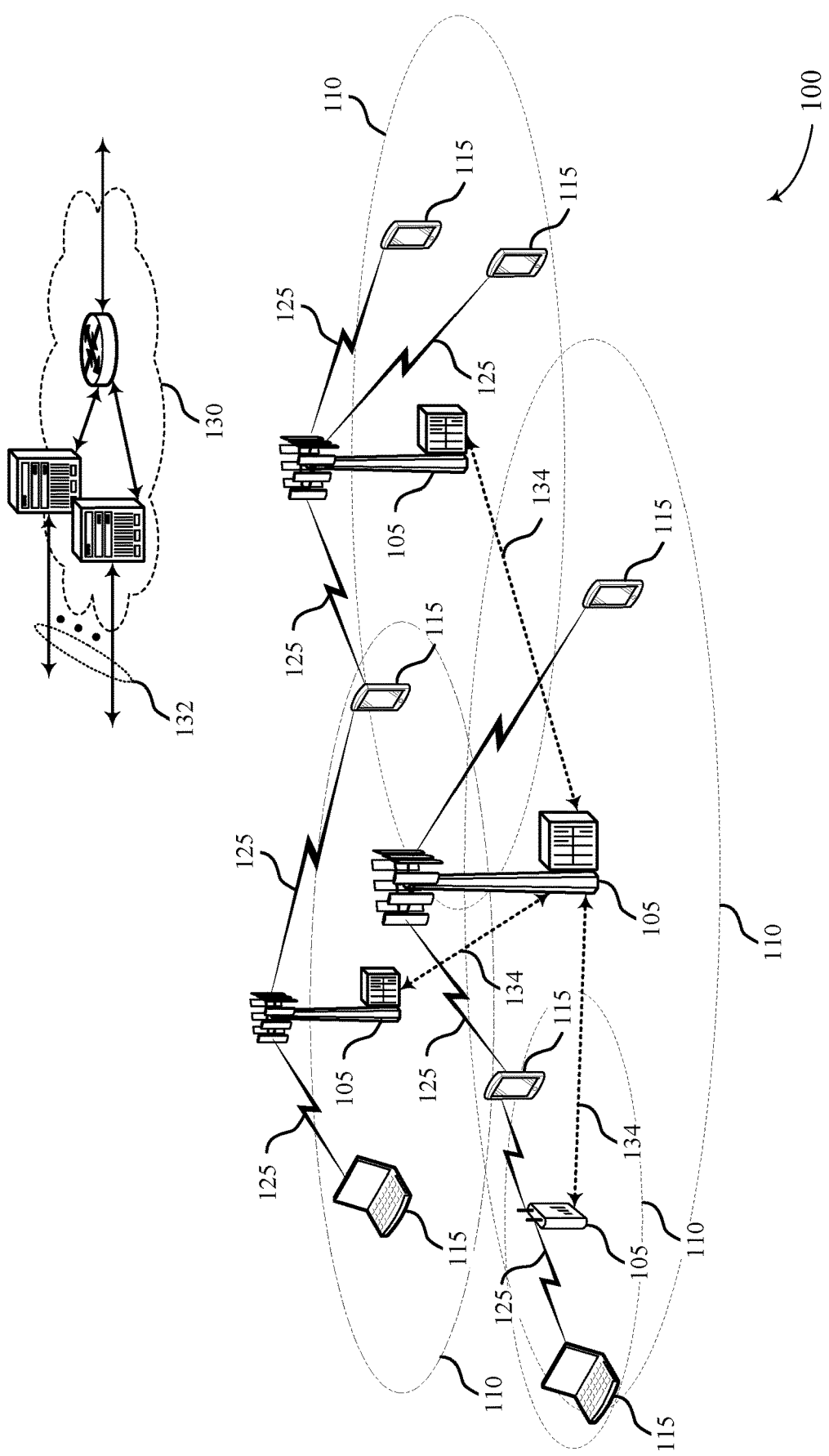
FIG. 1 illustrates an example of a wireless communication system that supports evolved semi-persistent scheduling for wireless communications in accordance with aspects of the present disclosure.

In various aspects of the disclosure, wireless communications may occur on a relatively well-defined periodic basis, and semi-persistent scheduling (SPS) may be employed to provide wireless transmission resources the periodic communications. In some cases, periodic transmissions may include one or more commands that may be transmitted from a base station or controller (e.g., a programmable logic controller (PLC)) to a user equipment (UE) or sensor/actuator (S/A). In response to the one or more commands, the UE or S/A may take some action and provide feedback information to the base station or controller. In some cases, such periodic communications may occur according to a well-defined ON-OFF duty cycle. Various described techniques provide for configuring SPS in which multiple time intervals are scheduled, which may correspond to time periods in the ON-OFF duty cycle in which commands and feedback information may be exchanged (e.g., an ON portion of the duty cycle).

In some cases, each time interval may be configured in an SPS configuration to include multiple slots that may be scheduled by different uplink or downlink resource allocations. In such cases, one or more slots may be configured with downlink resources in which one or more commands may be provided to a UE or S/A, and one or more slots may be configured with uplink resources in which feedback information (e.g., a sensor measurement or acknowledgment that a command has been completed) may be provided back to the base station or controller.

In some existing wireless communication systems, SPS may be configured such that particular periodic uplink or downlink resources may be scheduled, and the SPS may be turned on or off depending on traffic needs. For example, a base station may schedule a UE with a number of resource blocks (RBs) of uplink resources within a slot for periodic transmissions (e.g., three uplink RBs in every fifth slot). Likewise, the base station may schedule a number of downlink RBs according to a second SPS configuration.

However, in deployments where a base station and UE may have a relatively large number of uplink and downlink transmissions within a particular time window such separate SPS configurations for each of the periodic uplink and downlink transmissions may be inefficient. For example, in some systems each SPS configuration may have a separate radio network temporary identifier (RNTI) that a UE may use for blind decoding of received transmissions to identify data intended for the UE. Such multiple blind decodes may consume a relatively large amount of processing resources. Furthermore, in some cases an upper limit of SPS configurations per UE may be established which may impact the ability to configure SPS resource allocations in deployments where a base station and UE may periodically transmit multiple uplink and downlink transmissions during periodic time windows. Thus, SPS configurations that may be provided in accordance with various techniques provided herein, which may be referred to as enhanced SPS (eSPS), may enhance efficiency by supporting multiple uplink and downlink resource allocations within a periodic time window with a single SPS configuration. Such techniques may enhance UE and base station efficiency and provide efficient SPS configuration and operation, for example by scheduling over multiple intervals containing a same schedule for multiple time windows. Further, techniques described herein may enhance UE and base station efficiency by reducing the number of blind decodes the UE may perform for data transmissions it receives In some cases, the SPS configuration may include an ON-OFF duty cycle where an ON portion of the duty cycle spans a portion of a time interval and includes uplink and downlink resources, and an OFF portion of the duty cycle spans a remaining portion of the time interval and does not include any allocated SPS resources. In some cases, the ON portion of the duty cycle may repeat for a number of occasions, followed by the OFF portion of the duty cycle for a remaining portion on the time interval. Such SPS configurations may be used, for example, for transmission of sensor data and command information between PLCs and S/As in a factory automation network.

Aspects of the disclosure are initially described in the context of a wireless communication system. Several examples of periodic transmissions between UEs and base stations that may use SPS techniques provided herein are then discussed. Aspects of the disclosure are further illustrated by and described with reference to apparatus diagrams, system diagrams, and flowcharts that relate to evolved semi-persistent scheduling (eSPS) for wireless communications.

FIG. 1 illustrates an example of a wireless communication system 100 that supports evolved semi-persistent scheduling for wireless communications in accordance with aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, or a New Radio (NR) network. In some cases, wireless communication system 100 may support enhanced broadband communications, ultra-reliable (e.g., mission critical) communications, low latency communications, or communications with low-cost and low-complexity devices. In some cases, base stations 105 and UEs 115 may have periodic communications in which multiple transmissions may occur within periodic time intervals that are configured in accordance with SPS techniques provided herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

As indicated above, in some deployments wireless communications may occur on a relatively well-defined periodic basis, and SPS may be employed to provide wireless transmission resources the periodic communications. In some cases, periodic transmissions may include one or more commands that may be transmitted from a base station 105 to a UE 115, and in response to the one or more commands, the UE 115 may take some action and provide feedback information to the base station 150. In some cases, such periodic communications may occur according to a well-defined ON-OFF duty cycle. Various described techniques provide for configuring SPS in which multiple time intervals are scheduled, which may correspond to time periods in the ON-OFF duty cycle in which commands and feedback information may be exchanged (e.g., an ON portion of the duty cycle).

In some cases, each time interval may be configured in an SPS configuration to include multiple slots that may be scheduled by different uplink or downlink resource allocations. In such cases, one or more slots may be configured with downlink resources in which one or more commands may be provided to a UE 115, and one or more slots may be configured with uplink resources in which feedback information (e.g., a sensor measurement or acknowledgment that a command has been completed) may be provided back to the base station 105.

Particular implementations of the subject matter described in this disclosure can be implemented to realize one or more of the following potential advantages. In some implementations, the described techniques can be used to transmit or receive a number of downlink and uplink resources within multiple time intervals, each of the multiple time intervals including different resource allocations. Evolved SPS scheduling techniques may allow for flexible allocation of resources over a time interval or multiple time intervals. For example, some intervals may include both uplink and downlink resources, while other intervals may include only uplink or downlink resources. Further, a number of slots may include either uplink or downlink resources. This may allow for retransmission of data or other processes.

One example of an advantage of a UE utilizing an SPS configuration with an ON-OFF duty cycle that spans a set of the multiple time intervals, where an ON portion of the ON-OFF duty cycle includes one or more uplink resources, one or more downlink resources, or combinations thereof (and an OFF portion of the ON-OFF duty cycle spans a remaining number of slots) is that the UE may utilize schedule aggregation for such ON-OFF portions of the duty cycle. For example, the SPS schedule for each scheduled traffic window (e.g., the SPS schedule during ON slots) may be aggregated, and the SPS schedule for the OFF portion slots may also be aggregated, which may increase available transmission bandwidths.

In some cases, an SPS configuration may include aggregation information for the multiple time intervals indicating the downlink and uplink resources within each of the multiple time intervals, where the aggregation information within each of the multiple time intervals repeats during a configured time period. This kind of SPS configuration is advantageous to systems that utilize a regular duty cycle structure, such as those common in factory automation scenarios. For example, the SPS configuration may group certain sets of resources or certain transmissions over a time period, which may increase scheduling coordination and efficiency.

One advantage of an SPS configuration including a number of configured time periods during which the SPS scheduling configuration applies is that each time interval may be separately or flexibly configured to include multiple slots that may be scheduled by different uplink or downlink resource allocations. In such cases, one or more slots may be configured with downlink resources such that one or more commands may be provided to a UE. In addition, one or more slots may be configured with uplink resources which may allow for more seamless transmission of feedback information to a base station.

Figure 2:
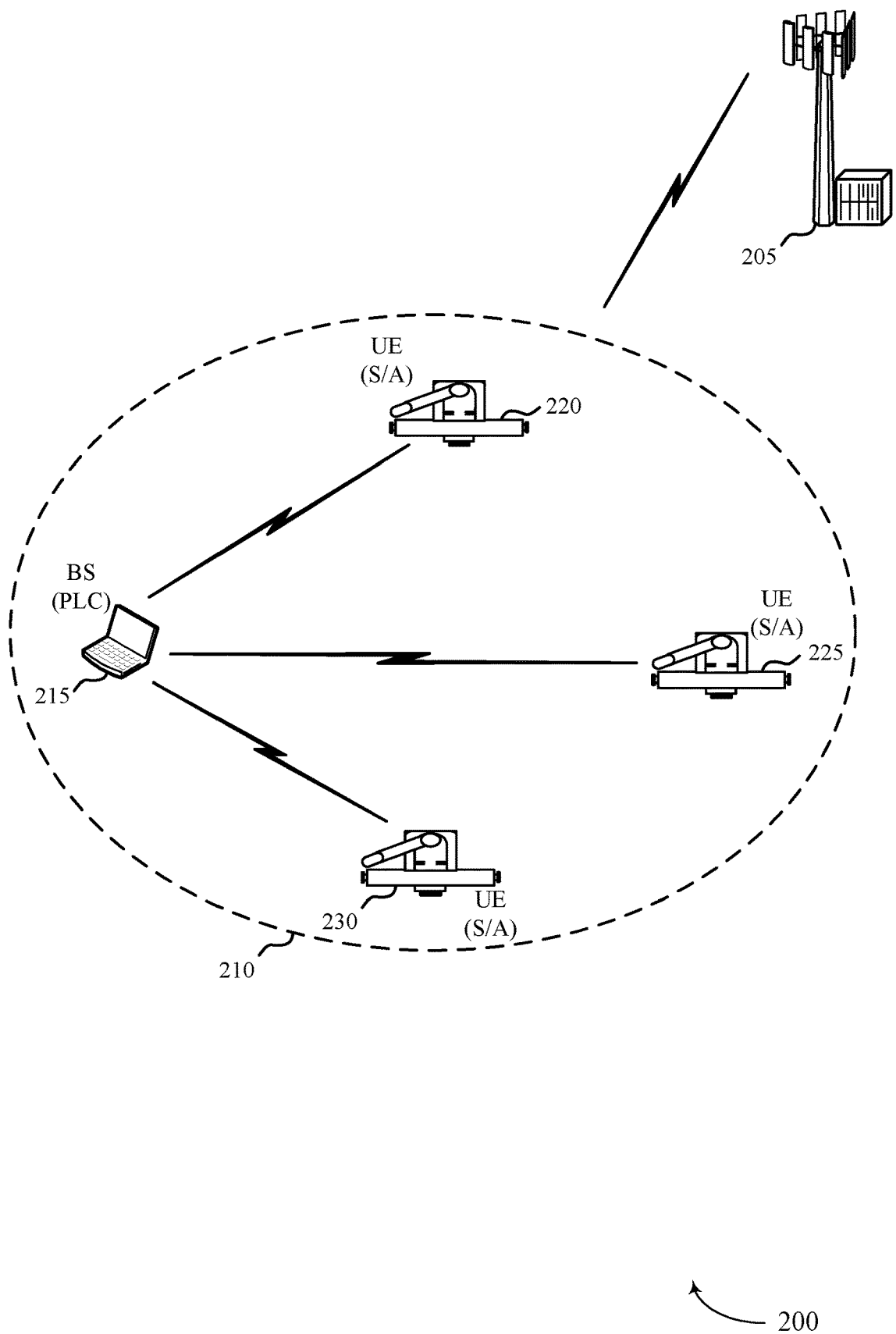
FIG. 2 illustrates an example of a portion of a wireless communication system that supports evolved semi-persistent scheduling for wireless communications in accordance with aspects of the present disclosure.

FIG. 2 illustrates an example of a wireless communication system 200 that supports evolved semi-persistent scheduling for wireless communications in accordance with aspects of the present disclosure. In some examples, wireless communication system 200 may implement aspects of wireless communication system 100. Wireless communication system 200 may include a base stations 205 and 215, and UEs 220, 225, and 230, which may be examples of the corresponding devices described herein. Broadly, wireless communication system 200 illustrates one example of an environment where SPS protocols may be utilized, such as in factory automation settings.

By way of example only, the UEs 220, 225, and 230 may be associated with sensor/actuator (S/A) of an associated piece of equipment in a particular zone 210, such as a zone within a factory automation setting. In some examples, the UEs 220, 225, and 230 may perform wireless communications with each other and/or with base station 215 which may be an example of a programmable logic controller (PLC) in a factory automation setting. In some aspects, the wireless communications may be SPS based communications that support defined latency and/or reliability requirements. Thus, base station 215 may perform communications with one or more of UEs 220, 225, and/or 230. In some aspects, the SPS communications may be between one or more of the UEs. For example, some of the UEs (e.g., UEs 220, 225, 230) may be configured as S/As to perform various function within the factory automation setting, and base station 215 may be configured as a PLC that oversees and/or manages aspects of one or more S/As. Although three UEs are shown within zone 210, it is to be understood that more or fewer UEs may be utilized in accordance with aspects of the present disclosure. In one non-limiting example, a factory automation setting may include hundreds or even thousands of UEs within a zone 210. In some aspects, the UEs within the zone 210 may be considered a set of UEs with which the base station 215 is performing SPS communications.

In some aspects, base station 215 (alone or in conjunction with base station 205) may configure the UEs within zone 210 for SPS communications. For example, base station 215 may use RRC signaling to provide an indication of the pre-configured SPS resources to be used for the SPS communications between one or more of the UEs and base station 215 and/or inter-communications between the UEs. Base station 215 may activate/deactivate the preconfigured SPS resources for one or more UEs for a particular subframe (or other time period) by including a trigger in the DCI of the subframe. For example, the base station 215 may transmit a DCI in a physical downlink control channel (PDCCH) control signal, and each UE may attempt to decode the PDCCH by unscrambling a cyclic redundancy check (CRC) using an SPS cell radio network temporary identifier (SPS C-RNTI).

In some aspects, base station 215 may configure the UEs within zone 210 with an SPS configuration that provides a number of resource allocations within multiple time intervals. In some cases, base station 215 may configure SPS such that multiple time intervals are scheduled, which may correspond to time periods in an ON-OFF duty cycle in which commands and feedback information may be exchanged (e.g., an ON portion of the duty cycle). In some cases, each time interval may be configured in an SPS configuration to include multiple slots that may be scheduled by different uplink or downlink resource allocations. In such cases, one or more slots may be configured with downlink resources such that one or more commands may be provided to a UE 220, 225, or 230, In addition, one or more slots may be configured with uplink resources in which feedback information (e.g., a sensor measurement or acknowledgment that a command has been completed) may be provided back to the base station 215.

Figure 3:
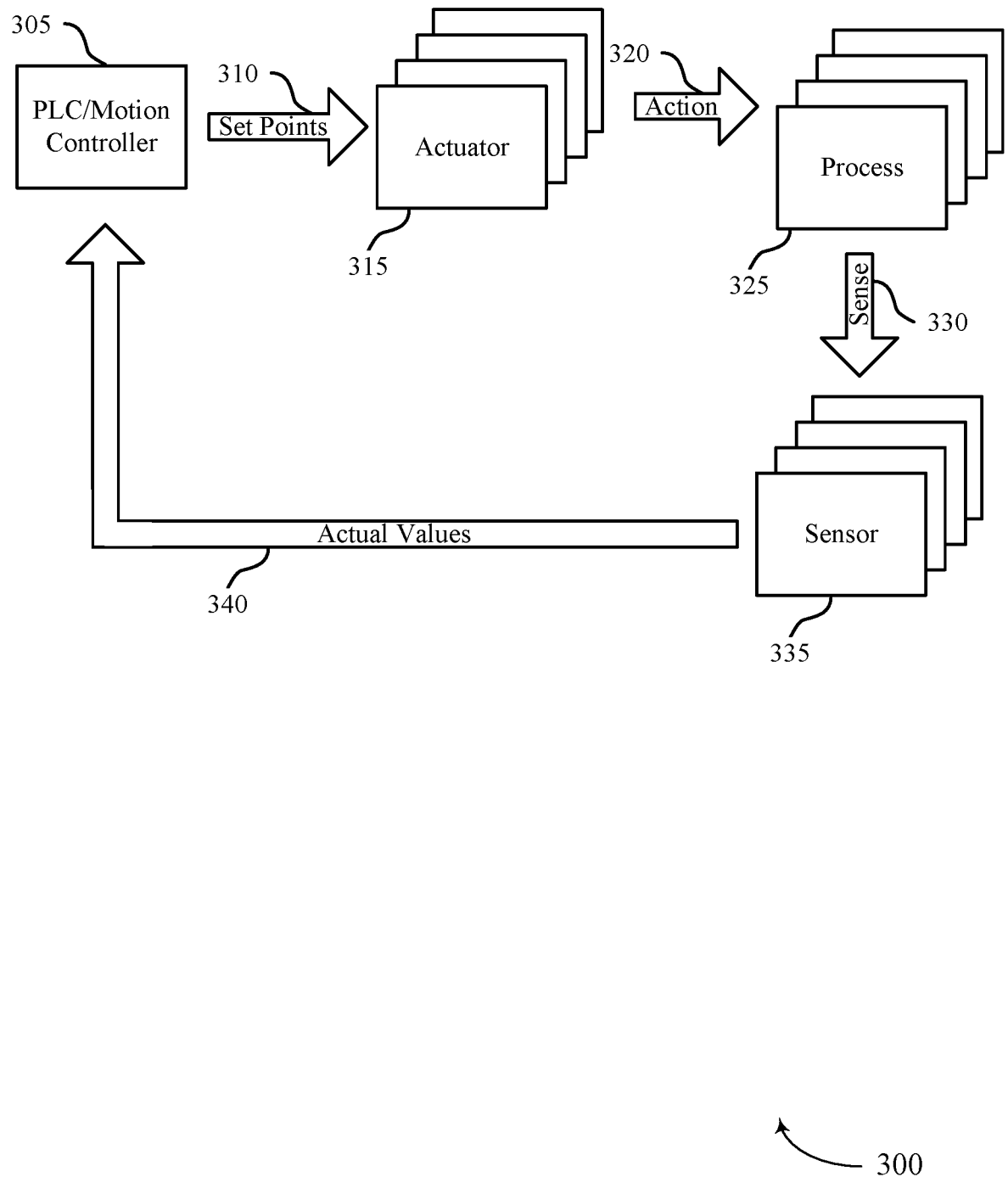
FIG. 3 illustrates an example of a wireless communication control and feedback system that supports evolved semi-persistent scheduling for wireless communications in accordance with aspects of the present disclosure.

FIG. 3 illustrates an example of a wireless communication control and feedback system 300 that supports evolved semi-persistent scheduling for wireless communications in accordance with aspects of the present disclosure. In some examples, wireless communication control and feedback system 300 may implement aspects of wireless communication system 100 or 200. In some cases, the wireless communication control and feedback system 300 may be an example of a factory automation network, although the techniques discussed herein may be used in any of a number of different deployments and the factory automation networks of several examples herein are described for purposes of discussion and illustration only.

In the example of FIG. 3, a PLC or motion controller 305, which may be an example of a base station (e.g., a base station 105 of FIG. 1 or 2) may provide one or more commands or set points 310 to one or more actuators 315. For example, one or more actuators 315 may be located at a piece of industrial equipment and the commends or set points 310 may instruct the piece of industrial equipment to operate according to the commands. The one or more actuators 315 may initiate one or more actions 320 associated with one or more processes 325. For example, the piece of industrial equipment may move a robotic arm from a first location to a second location based on a command or set point 310. The piece of industrial equipment may, as part of the processes 325, perform sense 330 operations using one or more sensors 335. For example, a motor controller at the piece of industrial equipment may provide an indication that the robotic arm is at a particular location. In some cases, the one or more sensors 335 may provide feedback information that may be used for further control of the piece of industrial equipment through transmission of actual values 340 back to the PLC or motion controller 305. For example, an optical sensor of sensors 335 may provide registration information of a relative position of a tool on a robotic arm and target position of the tool. The PLC or motion controller 305 may use such feedback information to provide further control commands (e.g., further motion commands to the robotic arm of the piece of industrial equipment). Such command and feedback communications may occur according to well-defined duty cycles which may be associated with periodic factory automation functions (e.g., in an automated assembly line in which the same operations may occur at well-defined periodic intervals).

In some cases, one or more actuators 315, processes 325, and sensors 335 may be associated with a particular UE or S/A, and the PLC or motion controller 305 may control numerous such UEs or S/As via wireless communications. In some cases, communications between the PLC or motion controller 305 and an S/A may have relatively stringent latency and reliability requirements. In order to provide wireless resources for such communications, the PLC or motion controller 305 may configure SPS resources. In cases where multiple uplink or downlink transmissions occur between the PLC or motion controller 305 and the S/As, the SPS configurations may provide multiple time intervals configured with multiple uplink resources, downlink resources, or combinations thereof. Such SPS configurations may provide reliable communications for such deployments that may help provide efficient communications with relatively stringent latency and reliability requirements.

Figure 4:
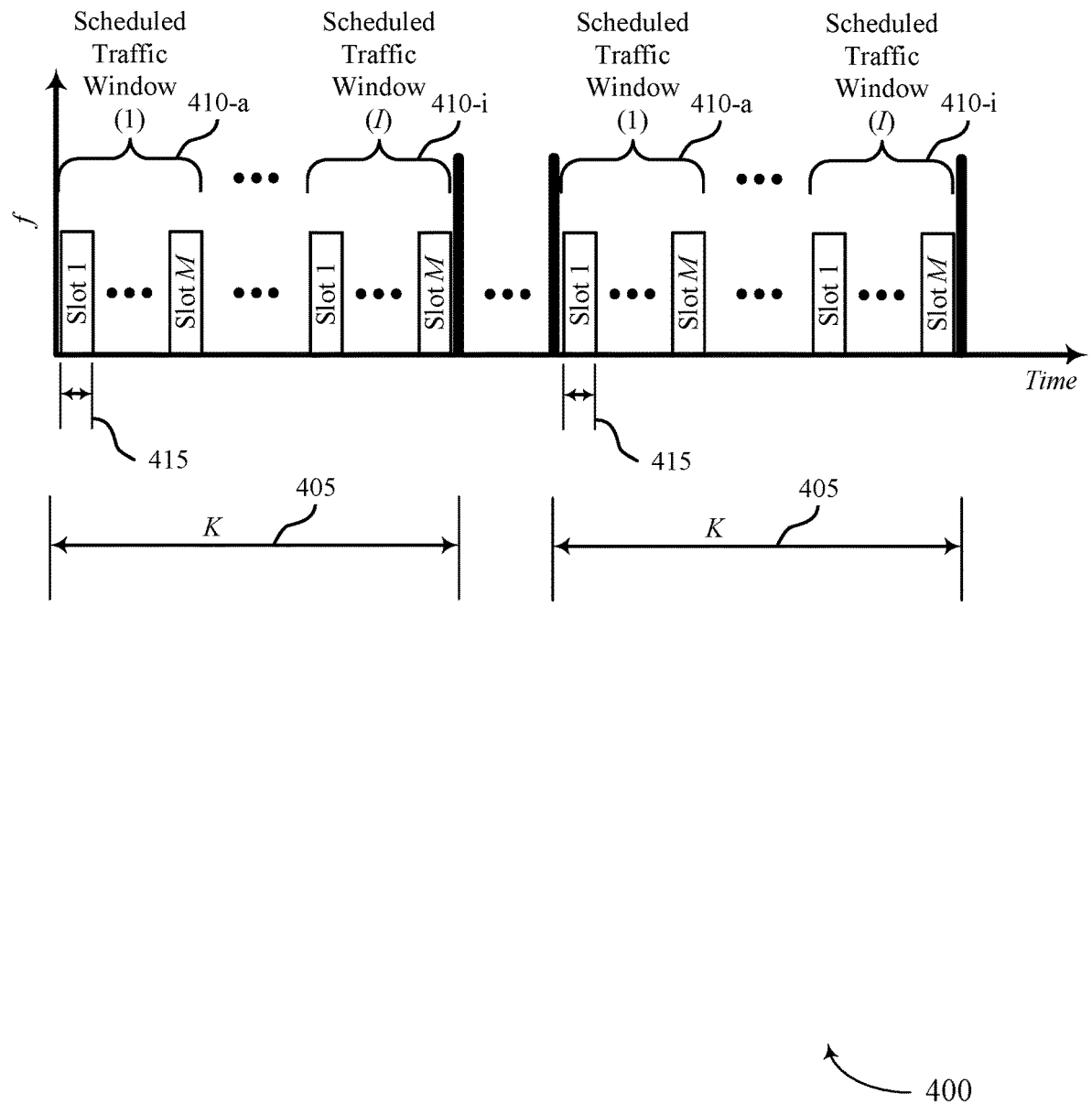
FIG. 4 illustrates an example of a timing for semi-persistent transmissions that supports evolved semi-persistent scheduling for wireless communications in accordance with aspects of the present disclosure.

FIG. 4 illustrates an example of a timing for semi-persistent transmissions 400 that supports evolved semi-persistent scheduling for wireless communications in accordance with aspects of the present disclosure. In some examples, timing for semi-persistent transmissions 400 may implement aspects of wireless communication system 100 or 200. In this example, a base station (e.g., a base station, PLC, etc.) may configure a number of time periods (K) 405, which may correspond to a number of slots or subframes in a wireless communication system. Within each time period 405, a scheduled traffic window 410 may be configured such that multiple slots (M) 415 may be configured according to an SPS profile. In some cases, slots 415 may be configured with uplink or downlink resources, may be configured to be off (e.g., configured for no transmissions), or may be configured as unspecified and available for one or more retransmissions.

In some examples, a particular S/A may engage in a periodic exchange of messages with a PLC according to a duty cycle, as discussed above. Such an exchange of messages may include, for example, a first downlink transmission in a first slot 415 (e.g., a movement command sent to a S/A from a PLC), a first uplink transmission in a second slot 415 (e.g., feedback information sent from the S/A to the PLC), a second downlink transmission in a third slot 415 (e.g., a further movement command or second command sent to the S/A from the PLC), and a second uplink transmission in a fourth slot 415 (e.g., a confirmation or other feedback from the S/A to the PLC). In some cases, using prior established SPS techniques in such cases may result in four separate SPS configurations at a S/A or UE, which may require the S/A or UE to perform blind decoding of DCI for four separate SPS RNTIs. In some cases, the periodic exchange of messages may include many more than four separate messages, which may result in more blind decodes if such SPS configurations were to be used. In accordance with techniques provided herein, a single SPS configuration (with a single SPS RNTI) may provide SPS resources for multiple uplink or downlink transmissions within a scheduled traffic window 410, which may repeat according to the periodicity K of time period 405.

In some cases, different sets of S/As may be active in different parts of the time period 405. For example, a PLC may provide control for several S/As, which may include S/As 1 through 5. The PLC may transmit downlink control commands to S/A 1 and S/A 2 in a first slot 415 of the scheduled traffic window 410, may transmit downlink control commands to S/A 3 and S/A 4 in a second slot 415, and may transmit control commands to S/A 1 and S/A 5 in a third slot 415. In addition, each of the S/As may transmit feedback information to the PLC in one or more slots 415. In such cases, the PLC (or other base station) may configure an SPS for each S/A to provide resources for such periodic exchanges of messages. In some cases, such SPS configurations may also be compliant with Time-Sensitive Networking (TSN) protocols such as in IEEE 802.1, which defines a cycle in terms of different intervals with a different set of gates (e.g., priority queues) being open/closed in each interval, and an overall cycle schedule is specified with a table of open/closed state of each gate in each interval (e.g., if cycle has I intervals and there are N gates, then the schedule table is of size I rows and N columns).

In some cases, the PLC or base station may perform eSPS to allocate resources to one or more S/As. For example, for a cycle corresponding to time period 405 having I intervals, each having M slots 415, the overall cycle period in terms of slots is K=M*I slots. In some cases, the PLC or base station may specify which PLCs or UEs are scheduled in each slot of each interval and the resources (e.g., RBs) allocated to them. In some cases, different beam pair links in a mmW system may be grouped based on the downlink and uplink resource requirements, in which part of the M slots may be used for downlink and part for uplink. In some cases, certain intervals may be downlink only and some uplink only. Further, some slots 415 may be left unspecified and scheduled later (e.g., for retransmissions on an as-needed basis).

In some cases, a specific S/A or UE may be active in one or more of the M slots 415, in which some slots 415 may have downlink resources and some slots may have uplink resources. The set of active resources (e.g., slots and RBs) in each interval corresponding to scheduled traffic window 410 of the cycle corresponding to time period 405 stays the same for the UE or S/A until modified. In such cases, from a UE or S/A perspective, the SPS provides of a persistent schedule of period M*I slots, with the indication of allocated downlink/uplink resources, or no activity, in each of the slots. An example of a base station or PLC SPS configuration for multiple UEs is illustrated in Table 1. From the perspective of a particular UE or S/A, a single column of Table 1 may be used as the SPS configuration.

TABLE 1

Evolved Semi-Persistent Schedule (eSPS) for UE 1, UE 2, . . .

| Slot | UE 1 | UE 2 | . . . |
|---|---|---|---|
| 1 | DL, RB1-3 | Off | . . . |
| 2 | Off | DL, RB4-6 | . . . |
| 3 | UL, RB4-6 | UL, RB1-3 | . . . |
| . . . | . . . | . . . | . . . |
| M*I | Off | Off | . . . |

In some cases, scheduled traffic windows 410 may only occupy a portion of a cycle (e.g., time period 405) and multiple rounds of scheduled traffic windows 410 may be present. In some cases, an SPS schedule may provide an indication of the portion of a cycle that has configured SPS resources and an indication of a remaining portion of the cycle that may not have configured SPS resources. An example of such a case is discussed with reference to FIG. 5.

Figure 5:
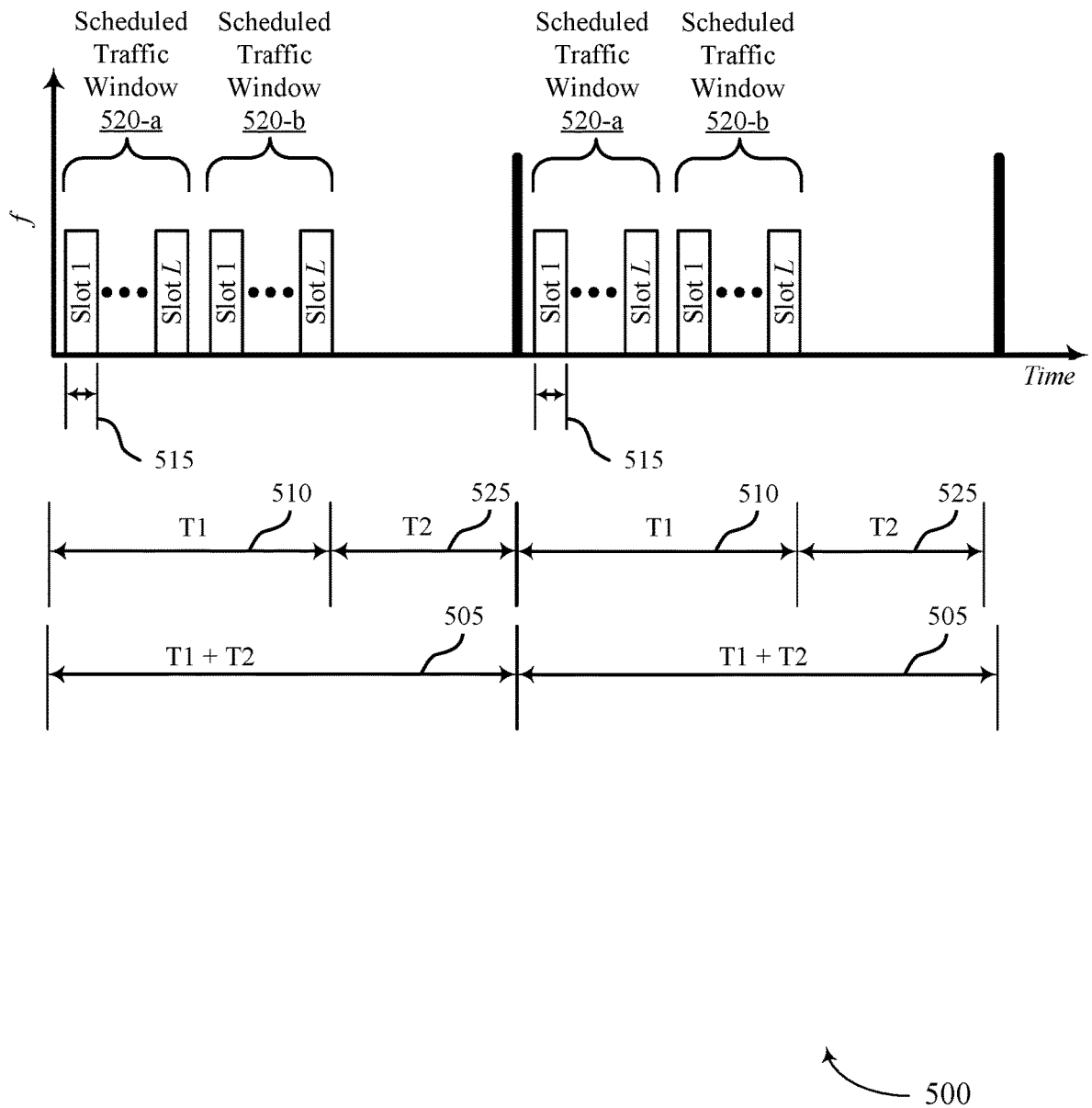
FIG. 5 illustrates another example of a timing for semi-persistent transmissions that supports evolved semi-persistent scheduling for wireless communications in accordance with aspects of the present disclosure.

FIG. 5 illustrates another example of a timing for semi-persistent transmissions 500 that supports evolved semi-persistent scheduling for wireless communications in accordance with aspects of the present disclosure. In some examples, timing for semi-persistent transmissions 500 may implement aspects of wireless communication system 100 or 200. In this example, a base station (e.g., a base station, PLC, etc.), similarly as discussed above, may configure a number of time periods 505 having a duration of T1+T2, which may correspond to a number of slots or subframes in a wireless communication system. Within each time period 505, a scheduled traffic windows 520 may be configured in which multiple slots (L) 515 may be configured according to an SPS profile, and the scheduled traffic windows 520 may occupy a portion of the time period 505 corresponding to T1. In some cases, slots 515 may be configured with uplink or downlink resources, may be configured to be off (e.g., configured for no transmissions), or may be configured as unspecified and available for one or more retransmissions, similar to as discussed above.

In the example of FIG. 5, the scheduled traffic windows 520 may correspond to an ON portion of an ON-OFF duty cycle where multiple rounds of traffic windows 520 may be configured. In this example, a first round may be scheduled in scheduled traffic window 520-a and a second round may be scheduled in traffic window 520-b, where each traffic window has a same SPS resource configuration. Thus, in such cases, SPS configuration information may be aggregated such that the resource allocations of the scheduled traffic windows 520 repeat, and the base station may convey an SPS schedule to the UE(s), that provides aggregated scheduling over multiple scheduled traffic windows 520 when the schedule remains the same over the scheduled traffic windows 520.

More specifically, in the example of FIG. 5, traffic with an ON-OFF duty-cycle may be present, which may be relatively common in some factory automation networks. In this example, the overall cycle period of time periods 505 is T1+T2 slots, where the PLC-S/A communication has an ON portion that corresponds to T1 slots 510 and the PLC-S/A communication has an OFF portion for the next T2 slots 525. During the ON portion, the PLC may communicate with different S/As in different resources (e.g., different slots and/or RBs). Thus, in this example, each scheduled traffic window 520 may have a duration that corresponds to L slots 515, where a first T1/L intervals include ON portion slots, and the remaining T2/L intervals include OFF portion slots. Furthermore, in cases that may use schedule aggregation, the SPS schedule over multi-round ON-slots (e.g., the schedule for each scheduled traffic window 520) can be aggregated, and the SPS schedule over the OFF portion slots can also be aggregated. An example of a resulting more compact SPS schedule is illustrated in Table 2.

TABLE 2

An eSPS allocation table for traffic with ON-OFF duty-cycle

| Slot | UE 1 | UE 2 | . . . |
|---|---|---|---|
| 1 | DL, RB1-3 | Off | . . . |
| 2 | Off | DL, RB4-6 | . . . |
| . . . | . . . | . . . | . . . |

TABLE 2-continued

An eSPS allocation table for traffic with ON-OFF duty-cycle

| Slot | UE 1 | UE 2 | ... |
|---|---|---|---|
| L | UL, RB4-6 | UL, RB1-3 | ... |
| Repeat Slots 1-L T1/L times | | | |
| T1 + 1 to T1 + T2 | Off | Off | ... |

In some cases, L may correspond to T1, and slots 1 to L may not be repeated within the duty cycle. In such cases, the eSPS configuration of Table 2 may include an indication that slots 1 to L are not repeated. In some cases, a base station may configure and signal a configuration for SPS to one or more UEs via radio resource control (RRC) signaling. In some cases, the base station may turn an SPS configuration on or off via downlink control information (DCI). In some cases, a UE may be configured with a duration of an SPS configuration and the base station may simply indicate to the UE when the SPS is to start. In some cases, the SPS resources may be used to convey command and sensor data between PLCs and S/As of a factory automation network. Additionally or alternatively, the SPS resources may be used to convey wireless network control information between UEs and base stations, such as channel state information (CSI) related transmissions, for example. In some cases, an eSPS configuration such as illustrated in Table 1 or Table 2 may be configured with an associated SPS RNTI for a UE. In some cases, one or more other SPS profiles may be configured at a UE, which may include one or more eSPS configurations, one or more regular SPS configurations, or combinations thereof.

Figure 6:
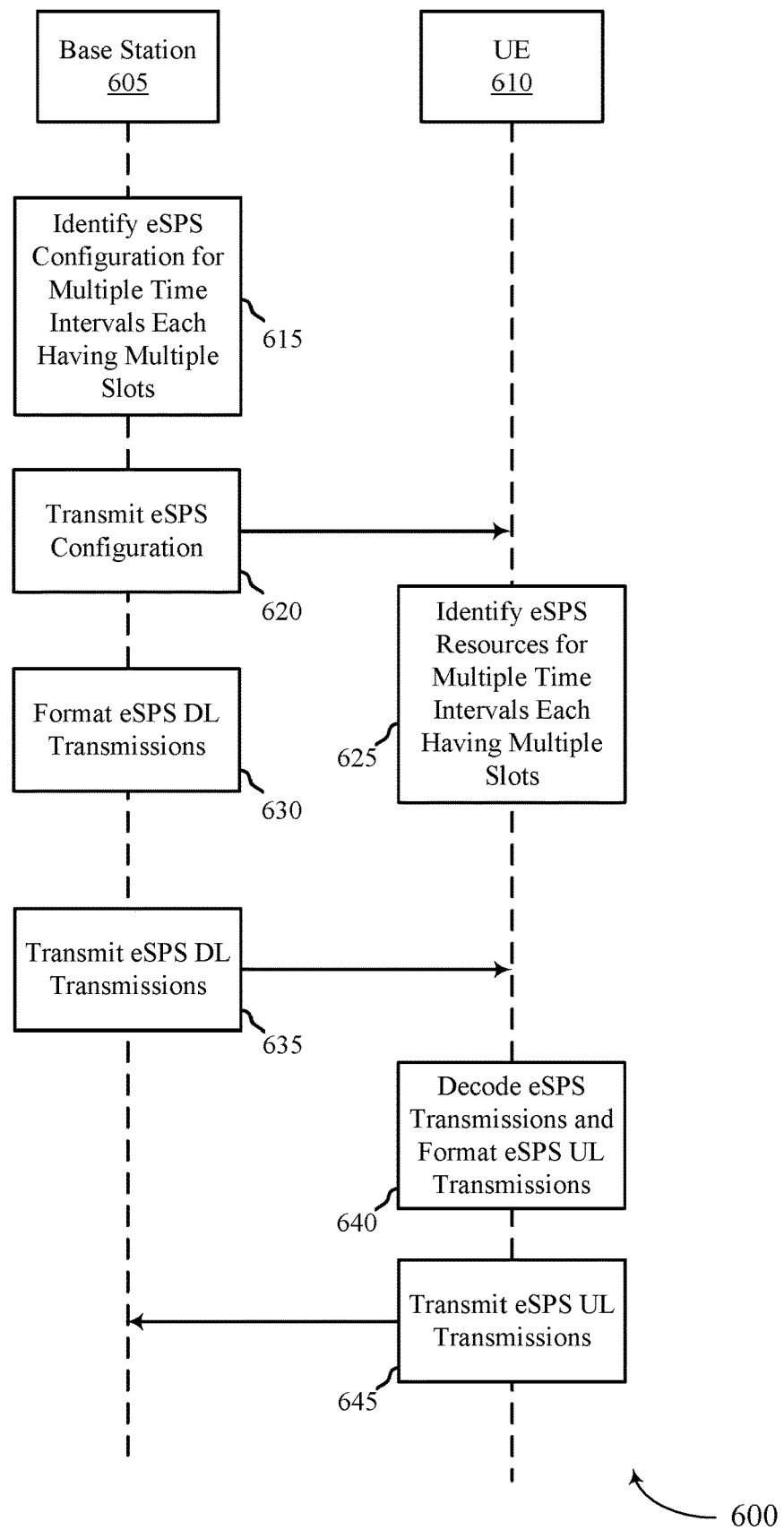
FIG. 6 illustrates an example of a process flow that supports evolved semi-persistent scheduling for wireless communications in accordance with aspects of the present disclosure.

FIG. 6 illustrates an example of a process flow 600 that supports evolved semi-persistent scheduling for wireless communications in accordance with aspects of the present disclosure. In some examples, process flow 600 may implement aspects of wireless communication system 100 or 200. Process flow 600 may include a base station 605 and a UE 610, which may be examples of corresponding devices described herein.

At 615, base station 605 may identify an eSPS configuration for multiple time intervals each having multiple slots. In some cases, the multiple time intervals may correspond to a scheduled traffic window of periodic communications between the UE 610 and the base station 605. The eSPS configuration may be configured for multiple different UEs, such as illustrated in Table 1 or Table 2 above, and the eSPS configuration for UE 610 may correspond to one column of the table.

At 620, the base station 605 may transmit, and UE 610 may receive, the eSPS configuration. In some cases, the eSPS configuration may be provided to the UE 610 via RRC signaling. In some cases, the eSPS configuration may include resource allocation information (e.g., allocated RBs) for each of a number of slots, an indication of a scheduling aggregation, an indication of a duty cycle, or combinations thereof.

At 625, the UE 610 may identify eSPS resources for multiple time intervals, each time interval containing multiple slots. In some cases, the time intervals may correspond to one or more scheduled traffic windows. The UE 610 may, as discussed herein, identify from the single eSPS configuration, one or more uplink resource allocations, one or more downlink resource allocations, or combinations thereof. In some cases, the UE 610 may use a single SPS RNTI to decode SPS control information corresponding to two or more SPS resource allocations.

At 630, the base station 605 may format eSPS downlink transmissions. Such downlink transmissions may include, for example, command information to be transmitted to the UE 610. In some cases, the command information may be command instructions to a S/A in a factory automation network.

At 635, the base station 605 may transmit (and the UE 610 may receive) eSPS downlink transmissions using allocated eSPS downlink resources. In some cases, the eSPS downlink transmissions may use downlink resources allocated in the eSPS, and UE 610 may receive eSPS transmissions in accordance with its eSPS configuration. In some cases, base station 605 may transmit eSPS downlink transmissions to multiple different UEs in accordance with an eSPS configuration for each UE.

At 640, the UE 610 may decode the eSPS transmissions and format one or more eSPS uplink transmissions. In some cases, the decoded eSPS transmissions may include command information and the UE 610 may perform one or more functions based on the decoded command. In some cases, the UE 610 may take a measurement or may identify feedback information associated with the command information and may format the measurement or feedback information into the one or more eSPS uplink transmissions. At 645, the UE 610 may transmit (and the base station 605 may receive) eSPS uplink transmissions using allocated eSPS uplink resources.

Figure 7:
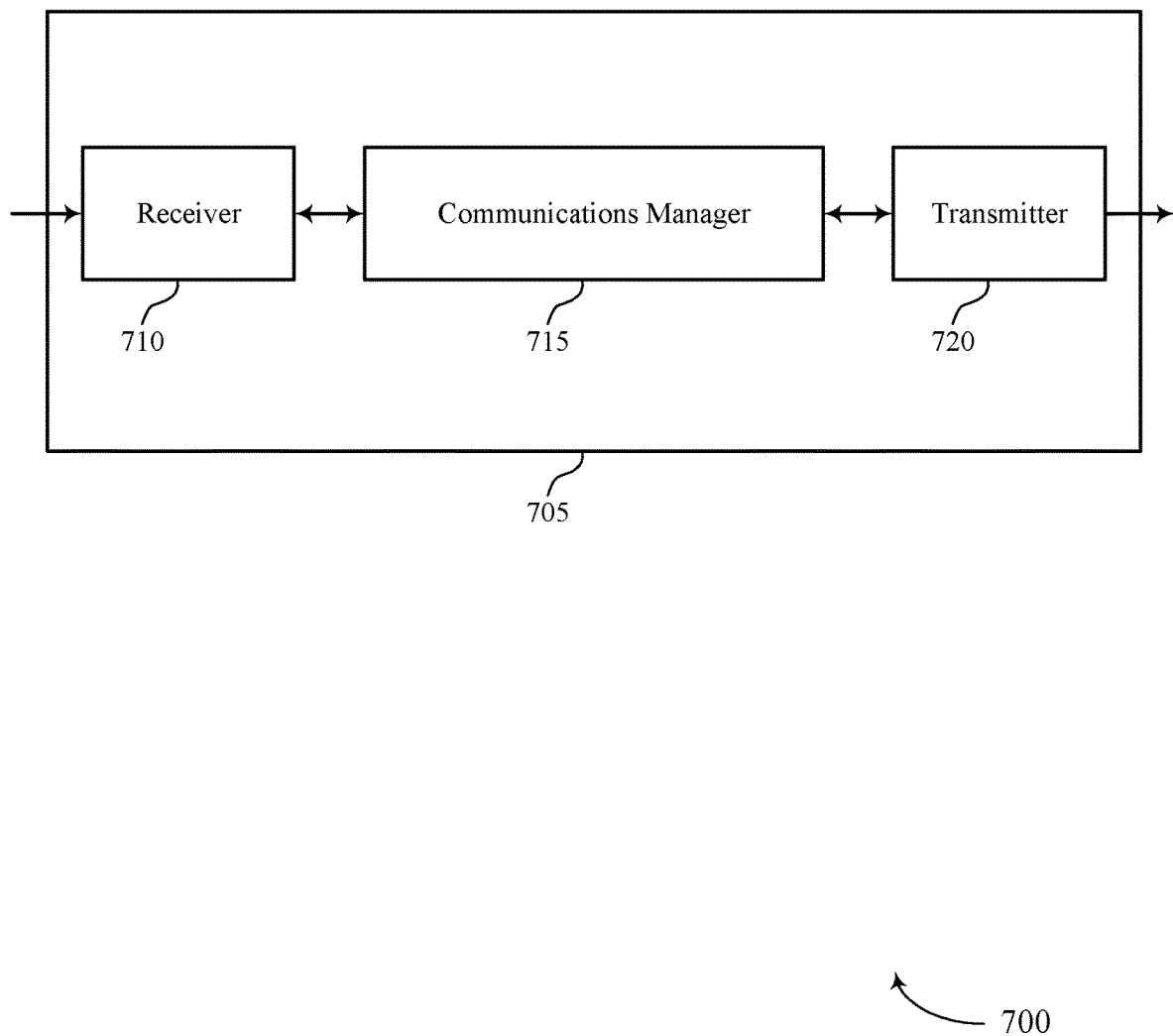
FIGS. 7 and 8 show block diagrams of devices that support evolved semi-persistent scheduling for wireless communications in accordance with aspects of the present disclosure.

FIG. 7 shows a block diagram 700 of a device 705 that supports evolved semi-persistent scheduling for wireless communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to evolved semi-persistent scheduling for wireless communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, a semi-persistent scheduling configuration that includes a set of downlink resources within multiple time intervals and a set of uplink resources within the multiple time intervals, each time interval of the multiple time intervals including multiple slots with different resource allocations, receive a set of downlink transmissions from the base station via the set of downlink resources, and transmit a set of uplink transmissions to the base station via the set of uplink resources. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
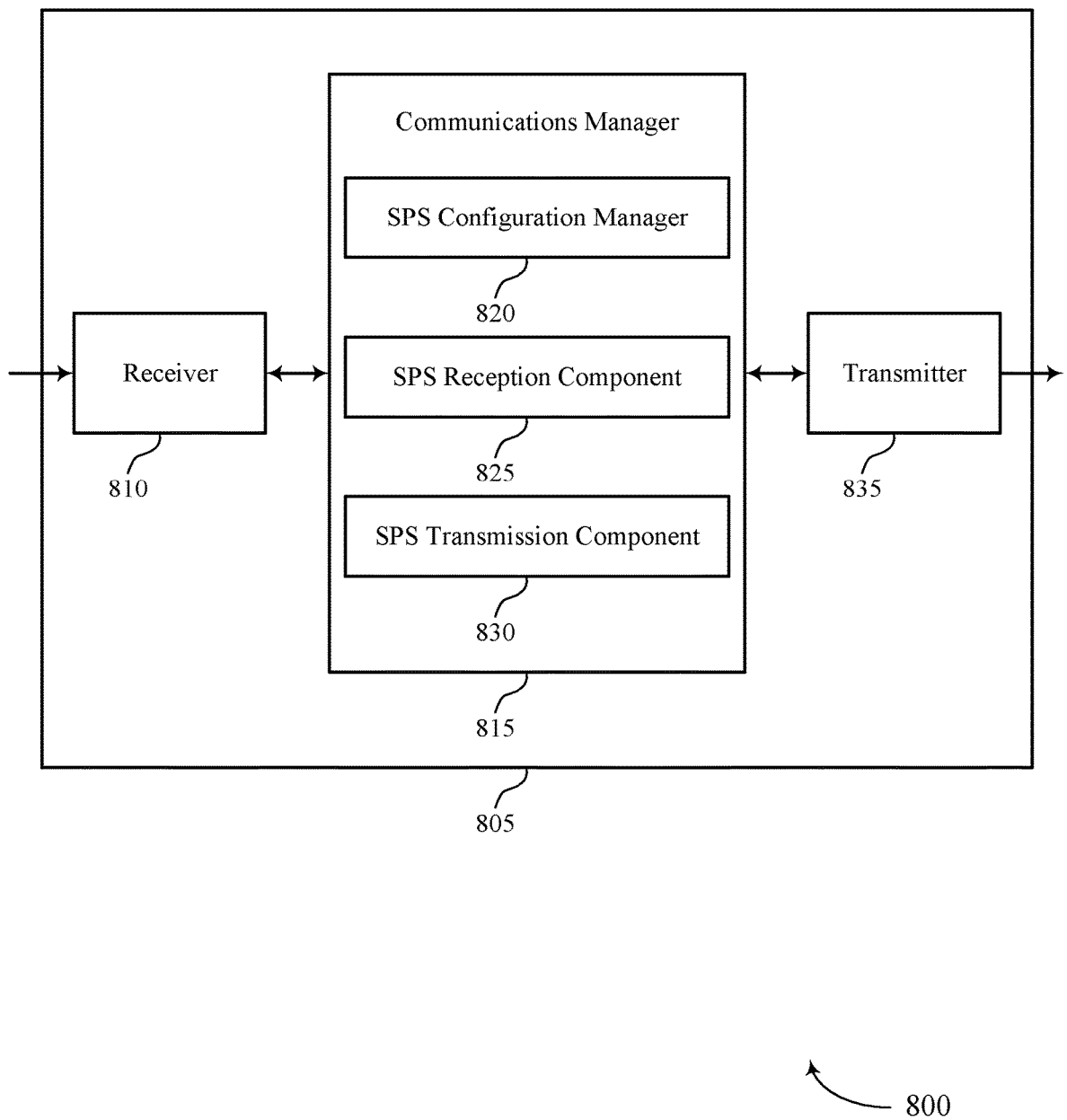

FIG. 8 shows a block diagram 800 of a device 805 that supports evolved semi-persistent scheduling for wireless communications in accordance with aspects of the present disclosure. The device 805 may be an example of aspects of a device 705 or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to evolved semi-persistent scheduling for wireless communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an SPS configuration manager 820, an SPS reception component 825, and an SPS transmission component 830. The communications manager 815 may be an example of aspects of the communications manager 1010 described herein.

The SPS configuration manager 820 may receive, from a base station, a semi-persistent scheduling configuration that includes a set of downlink resources within multiple time intervals and a set of uplink resources within the multiple time intervals, each time interval of the multiple time intervals including multiple slots with different resource allocations.

The SPS reception component 825 may receive a set of downlink transmissions from the base station via the set of downlink resources. The SPS transmission component 830 may transmit a set of uplink transmissions to the base station via the set of uplink resources.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
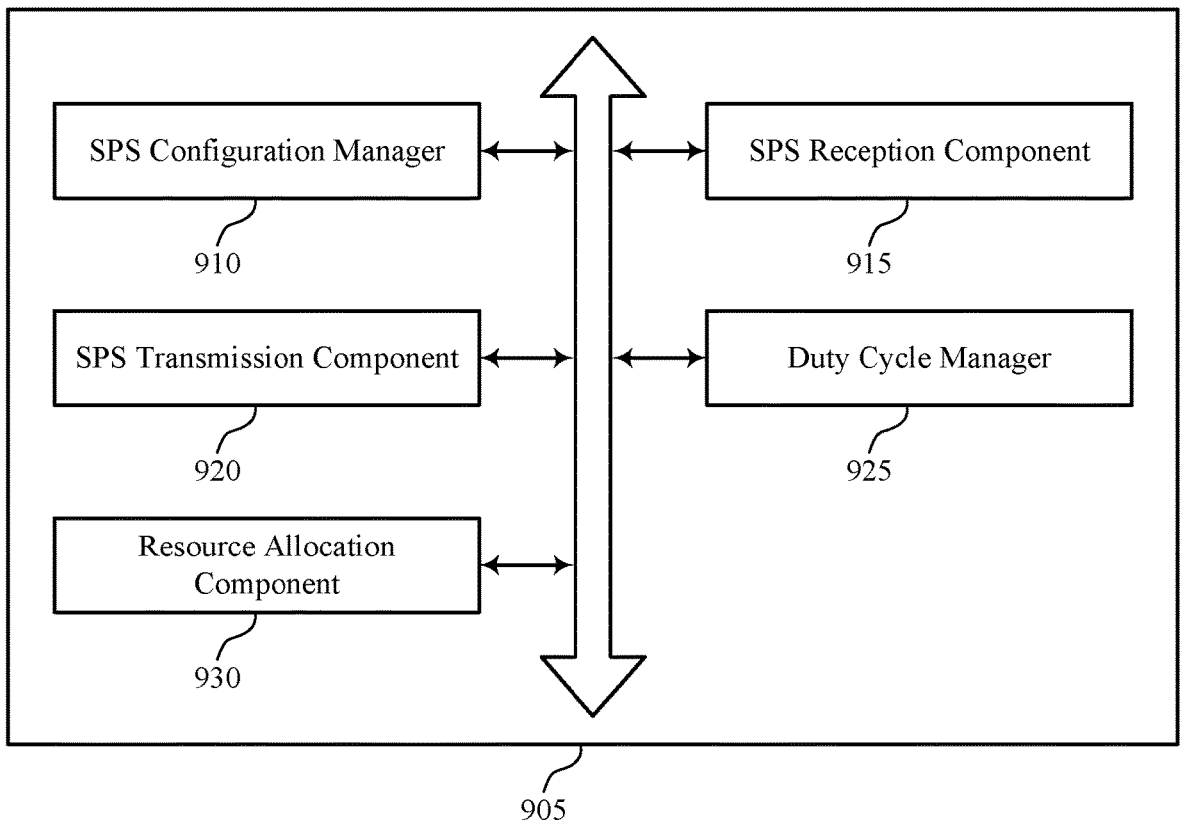
FIG. 9 shows a block diagram of a device that supports evolved semi-persistent scheduling for wireless communications in accordance with aspects of the present disclosure.

FIG. 9 shows a block diagram 900 of a communications manager 905 that supports evolved semi-persistent scheduling for wireless communications in accordance with aspects of the present disclosure. The communications manager 905 may be an example of aspects of a communications manager 715, a communications manager 815, or a communications manager 1010 described herein. The communications manager 905 may include an SPS configuration manager 910, an SPS reception component 915, an SPS transmission component 920, a duty cycle manager 925, and a resource allocation component 930. Each of these modules may communicate, directly or indirectly, with one another (e.g., via one or more buses).

The SPS configuration manager 910 may receive, from a base station, a semi-persistent scheduling configuration including a set of downlink resources and a set of uplink resources within multiple time intervals, each time interval of the multiple time intervals including multiple slots with different resource allocations. In some cases, the semi-persistent scheduling configuration may further include a number of configured time periods during which the semi-persistent scheduling configuration applies. In some cases, a duration of each configured time period is a product of a number of time intervals and a number of slots per time interval. In some cases, the set of uplink resources are used at least in part for transmission of sensor data in a factory automation network and the set of downlink resources are used at least in part for transmission of command information in the factory automation network. In some cases, the set of uplink resources and the set of downlink resources are used for transmission of control information (e.g., CSI information) in a factory automation network.

The SPS reception component 915 may receive a set of downlink transmissions from the base station via the set of downlink resources within multiple time intervals, and the SPS transmission component 920 may transmit a set of uplink transmissions to the base station via the set of uplink resources.

The duty cycle manager 925 may identify an ON-OFF duty cycle associated with the SPS configuration. In some cases, the semi-persistent scheduling configuration further includes an ON-OFF duty cycle that spans a set of the multiple time intervals, an ON portion of the ON-OFF duty cycle including one or more uplink resources of the set of uplink resources, one or more downlink resources of the set of downlink resources, or combinations thereof. In some cases, the ON portion of the ON-OFF duty cycle spans a first set of slots, and where an OFF portion of the ON-OFF duty cycle spans a second set of slots corresponding to a remaining number of slots of the multiple time intervals that are outside of the first set of slots. In some cases, the semi-persistent scheduling configuration further includes aggregation information for the multiple time intervals that indicates that the set of downlink resources and the set of uplink resources within each of the multiple time intervals repeats during a configured time period.

The resource allocation component 930 may identify uplink and downlink resources allocated by the SPS configuration. In some cases, each of the multiple time intervals correspond to scheduled traffic windows, where each slot of the multiple slots is scheduled by a resource allocation indicating uplink resources, downlink resources, or that no resources are allocated within the slot. In some cases, one or more of the multiple slots includes an unspecified resource allocation configured for subsequent scheduling. In some cases, the one or more of the multiple slots that include the unspecified resource allocation are available for retransmissions.

Figure 10:
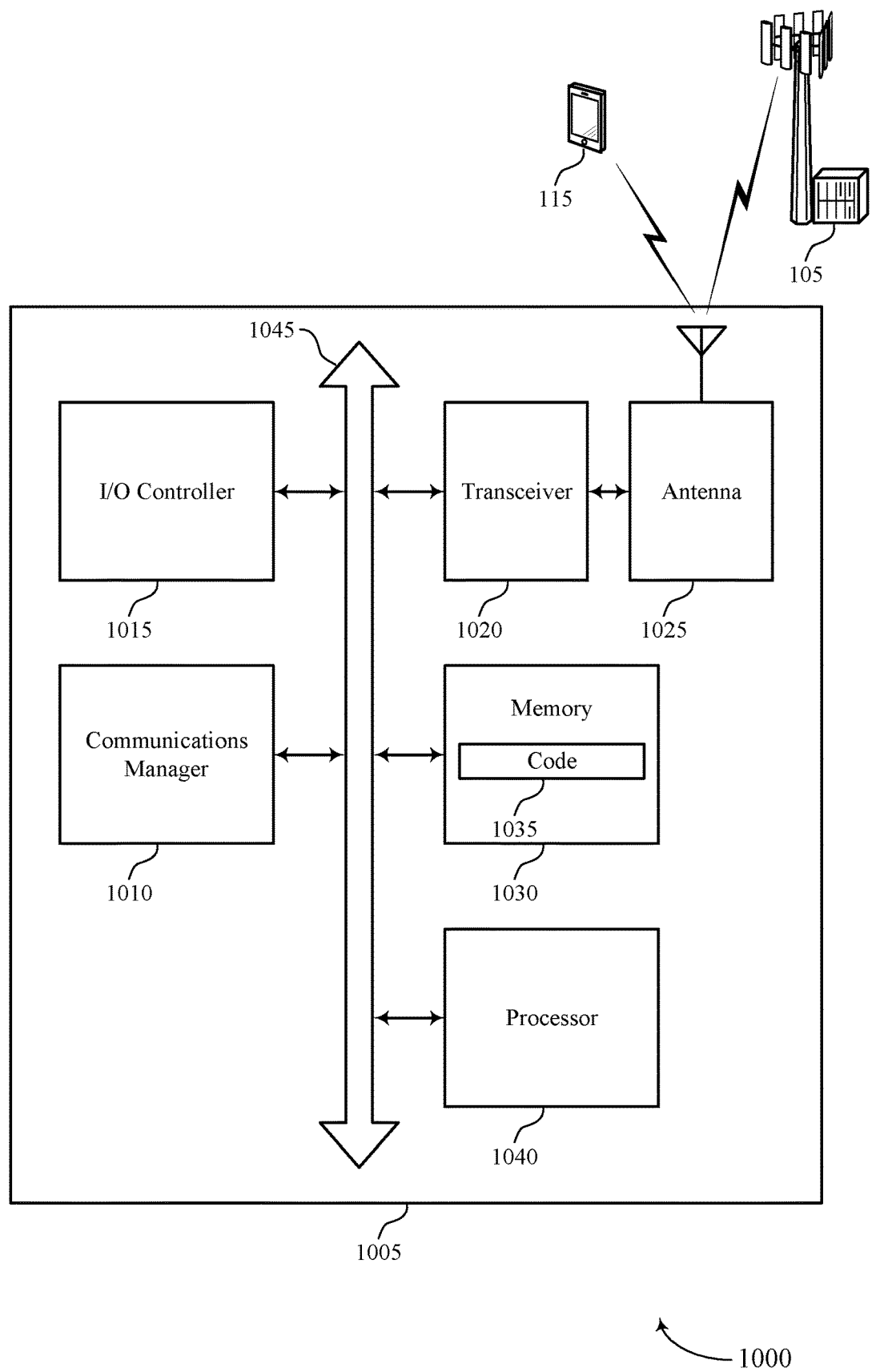
FIG. 10 shows a diagram of a system including a device that supports evolved semi-persistent scheduling for wireless communications in accordance with aspects of the present disclosure.

FIG. 10 shows a diagram of a system 1000 including a device 1005 that supports evolved semi-persistent scheduling for wireless communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be coupled and in electronic communication via one or more buses (e.g., bus 1045).

The communications manager 1010 may receive, from a base station, a semi-persistent scheduling configuration that includes a set of downlink resources within multiple time intervals and a set of uplink resources within the multiple time intervals, each time interval of the multiple time intervals including multiple slots with different resource allocations, may receive a set of downlink transmissions from the base station via the set of downlink resources, and transmit a set of uplink transmissions to the base station via the set of uplink resources.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting evolved semi-persistent scheduling for wireless communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
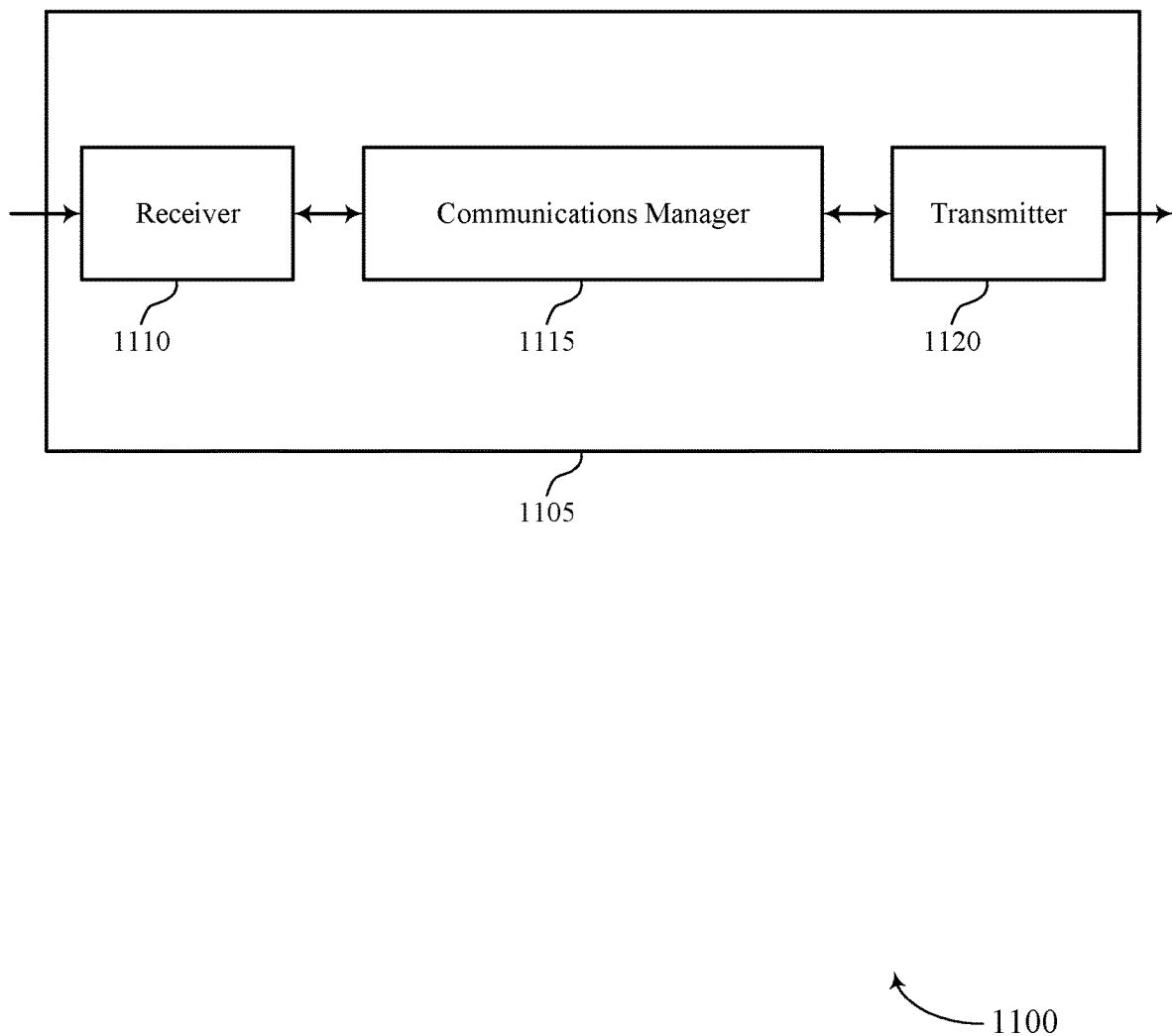
FIGS. 11 and 12 show block diagrams of devices that support evolved semi-persistent scheduling for wireless communications in accordance with aspects of the present disclosure.

FIG. 11 shows a block diagram 1100 of a device 1105 that supports evolved semi-persistent scheduling for wireless communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to evolved semi-persistent scheduling for wireless communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine a semi-persistent scheduling configuration for a UE that includes a set of downlink resources within multiple time intervals and a set of uplink resources within the multiple time intervals, each time interval of the multiple time intervals including multiple slots with different resource allocations, transmit the semi-persistent scheduling configuration to the UE, transmit a set of downlink transmissions to the UE via the set of downlink resources, and receive a set of uplink transmissions from the UE via the set of uplink resources. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
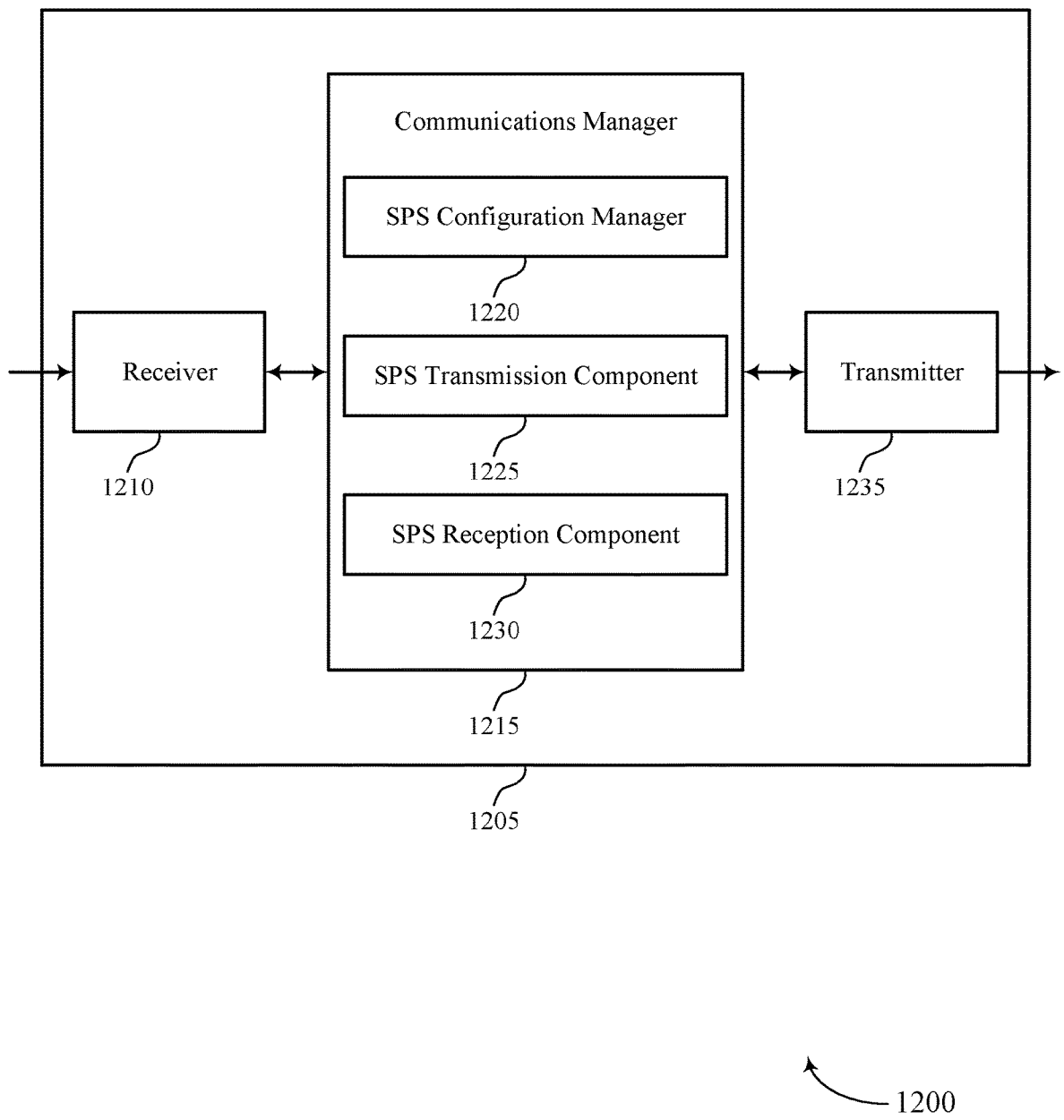

FIG. 12 shows a block diagram 1200 of a device 1205 that supports evolved semi-persistent scheduling for wireless communications in accordance with aspects of the present disclosure. The device 1205 may be an example of aspects of a device 1105 or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to evolved semi-persistent scheduling for wireless communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an SPS configuration manager 1220, an SPS transmission component 1225, and an SPS reception component 1230. The communications manager 1215 may be an example of aspects of the communications manager 1410 described herein.

The SPS configuration manager 1220 may determine a semi-persistent scheduling configuration for a UE that includes a set of downlink resources within multiple time intervals and a set of uplink resources within the multiple time intervals, each time interval of the multiple time intervals including multiple slots with different resource allocations and transmit the semi-persistent scheduling configuration to the UE.

The SPS transmission component 1225 may transmit a set of downlink transmissions to the UE via the set of downlink resources. The SPS reception component 1230 may receive a set of uplink transmissions from the UE via the set of uplink resources.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
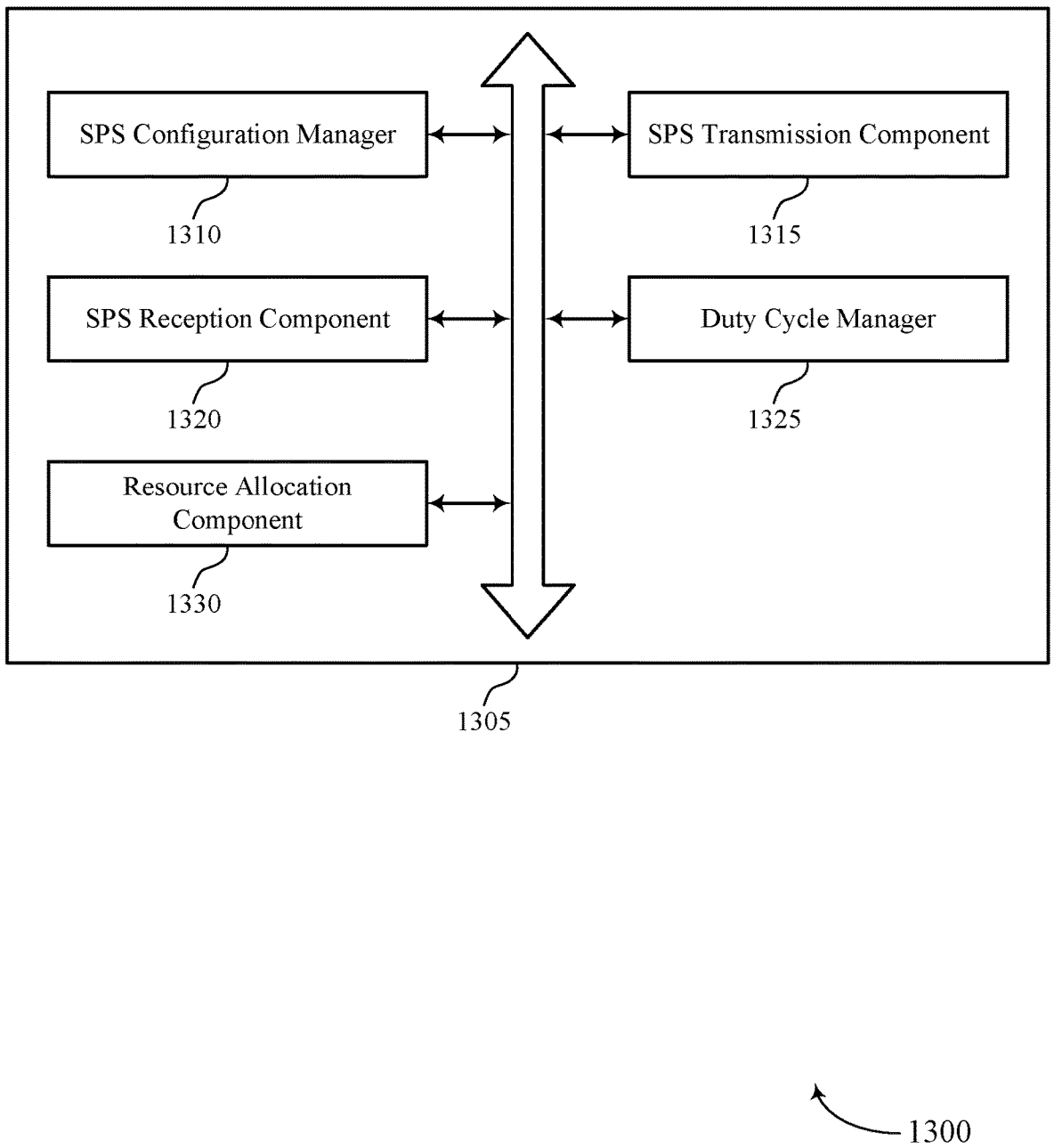
FIG. 13 shows a block diagram of a device that supports evolved semi-persistent scheduling for wireless communications in accordance with aspects of the present disclosure.

FIG. 13 shows a block diagram 1300 of a communications manager 1305 that supports evolved semi-persistent scheduling for wireless communications in accordance with aspects of the present disclosure. The communications manager 1305 may be an example of aspects of a communications manager 1115, a communications manager 1215, or a communications manager 1410 described herein. The communications manager 1305 may include an SPS configuration manager 1310, an SPS transmission component 1315, an SPS reception component 1320, a duty cycle manager 1325, and a resource allocation component 1330. Each of these modules may communicate, directly or indirectly, with one another (e.g., via one or more buses).

The SPS configuration manager 1310 may determine a semi-persistent scheduling configuration for a UE that includes a set of downlink resources within multiple time intervals and a set of uplink resources within the multiple time intervals, each time interval of the multiple time intervals including multiple slots with different resource allocations. In some examples, the SPS configuration manager 1310 may transmit the semi-persistent scheduling configuration to the UE. In some cases, the semi-persistent scheduling configuration further includes a number of configured time periods during which the semi-persistent scheduling configuration applies. In some cases, a duration of each configured time period is a product of a number of time intervals and a number of slots per time interval. In some cases, the set of uplink resources may be used at least in part for transmission of sensor data in a factory automation network and the set of downlink resources may be used at least in part for transmission of command information in the factory automation network. In some cases, the set of uplink resources and the set of downlink resources may be used for transmission of control information in a factory automation network.

The SPS transmission component 1315 may transmit a set of downlink transmissions to the UE via the set of downlink resources. The SPS reception component 1320 may receive a set of uplink transmissions from the UE via the set of uplink resources.

The duty cycle manager 1325 may identify an ON-OFF duty cycle associated with the SPS configuration. In some cases, the semi-persistent scheduling configuration further includes an ON-OFF duty cycle that spans a set of the multiple time intervals, an ON portion of the ON-OFF duty cycle including one or more uplink resources of the set of uplink resources, one or more downlink resources of the set of downlink resources, or combinations thereof. In some cases, the ON portion of the ON-OFF duty cycle spans a first set of slots, and an OFF portion of the ON-OFF duty cycle spans a second set of slots corresponding to a remaining number of slots of the multiple time intervals that are outside of the first set of slots. In some cases, the semi-persistent scheduling configuration further includes aggregation information for the multiple time intervals that indicates that the set of downlink resources and uplink resources within each of the multiple time intervals repeats during a configured time period.

The resource allocation component 1330 may identify uplink and downlink resources allocated according to the SPS configuration. In some cases, each of the multiple time intervals correspond to scheduled traffic windows, and where each slot of the multiple slots is scheduled by a resource allocation indicating uplink resources, downlink resources, or that no resources are allocated within the slot. In some cases, one or more of the multiple slots include an unspecified resource allocation configured for subsequent scheduling. In some cases, the one or more of the multiple slots that include the unspecified resource allocation are available for retransmissions.

Figure 14:
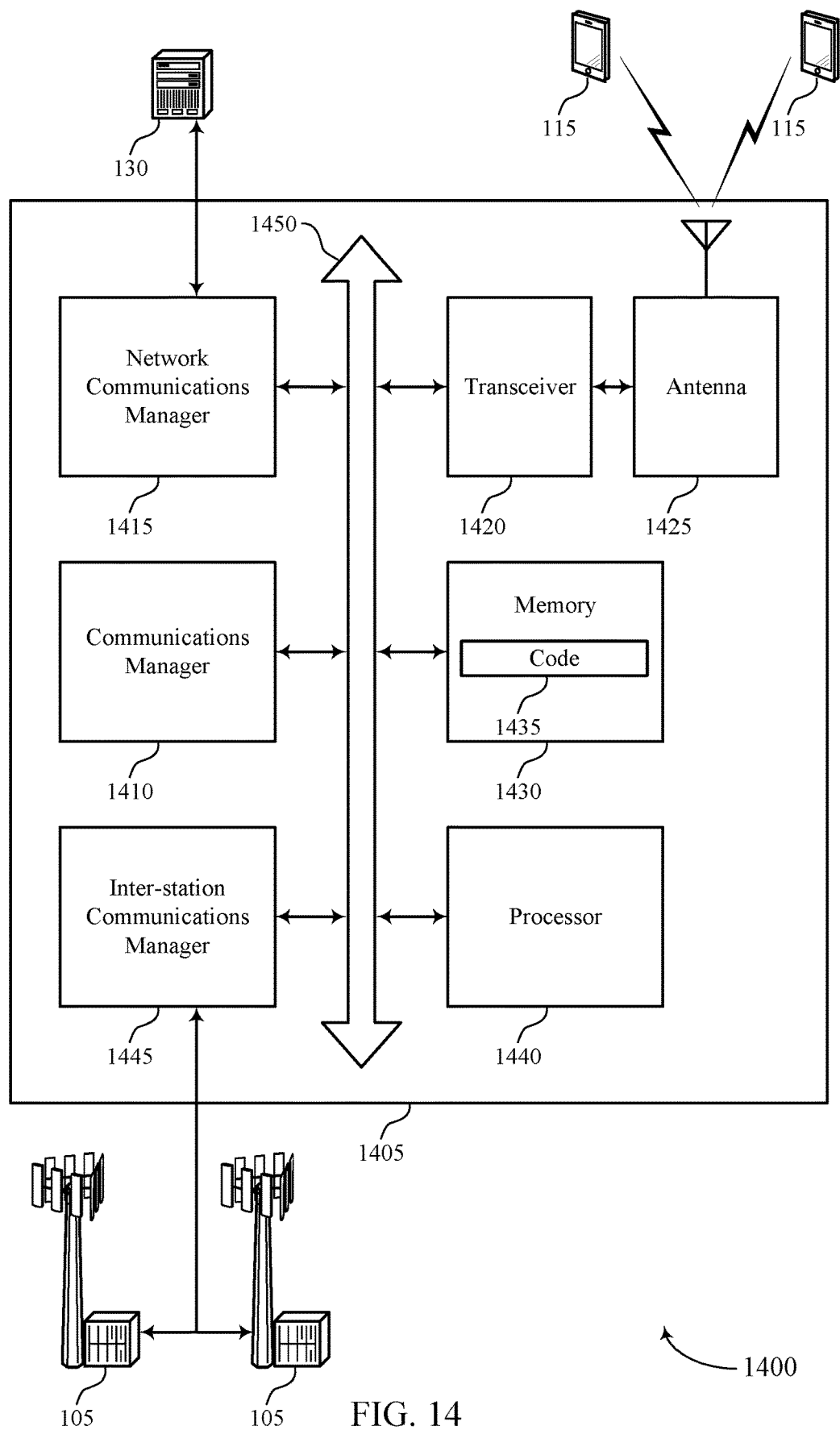
FIG. 14 shows a diagram of a system including a device that supports evolved semi-persistent scheduling for wireless communications in accordance with aspects of the present disclosure.

FIG. 14 shows a diagram of a system 1400 including a device 1405 that supports evolved semi-persistent scheduling for wireless communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be coupled and in electronic communication via one or more buses (e.g., bus 1450).

The communications manager 1410 may determine a semi-persistent scheduling configuration for a UE that includes a set of downlink resources within multiple time intervals and a set of uplink resources within the multiple time intervals, each time interval of the multiple time intervals including multiple slots with different resource allocations, transmit the semi-persistent scheduling configuration to the UE, transmit a set of downlink transmissions to the UE via the set of downlink resources, and receive a set of uplink transmissions from the UE via the set of uplink resources.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device to perform various functions (e.g., functions or tasks supporting evolved semi-persistent scheduling for wireless communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
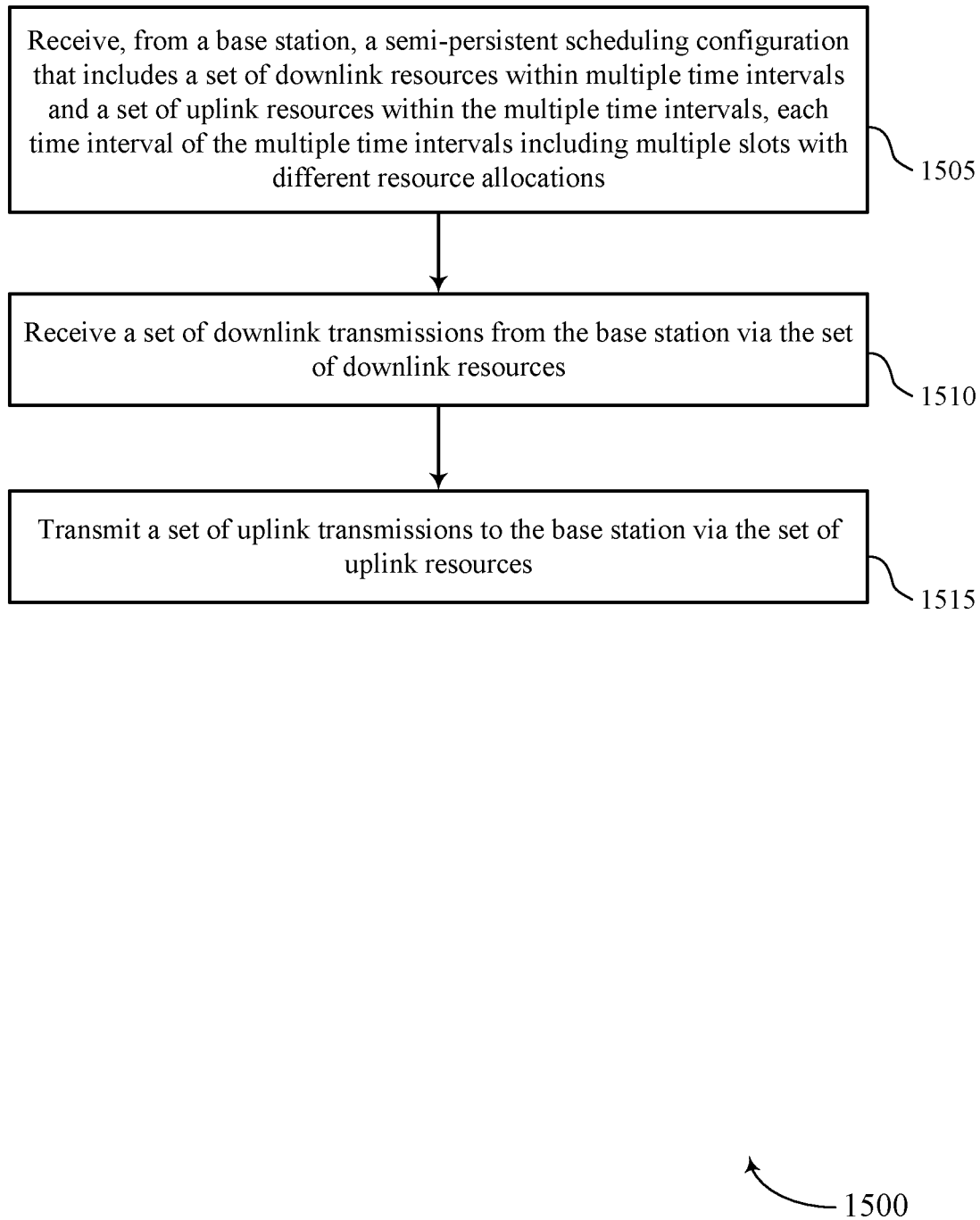
FIGS. 15 and 16 show flowcharts illustrating methods that support evolved semi-persistent scheduling for wireless communications in accordance with aspects of the present disclosure.

FIG. 15 shows a flowchart illustrating a method 1500 that supports evolved semi-persistent scheduling for wireless communications in accordance with aspects of the present disclosure. The operations of method 1500 may be implemented by a UE 115 or its components as described herein. For example, the operations of method 1500 may be performed by a communications manager as described with reference to FIGS. 7 to 10. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, a semi-persistent scheduling configuration that includes a set of downlink resources within multiple time intervals and a set of uplink resources within the multiple time intervals, each time interval of the multiple time intervals including multiple slots with different resource allocations. The operations of 1505 may be performed according to the methods described herein. In some examples, aspects of the operations of 1505 may be performed by an SPS configuration manager as described with reference to FIGS. 7 to 10. In some cases, the semi-persistent scheduling configuration further includes an ON-OFF duty cycle spanning a set of the multiple time intervals, and an ON portion of the ON-OFF duty cycle includes one or more uplink resources of the set of uplink resources, one or more downlink resources of the set of downlink resources, or combinations thereof. In some cases, the ON portion of the ON-OFF duty cycle spans a first set of slots, and an OFF portion of the ON-OFF duty cycle spans a second set of slots corresponding to a remaining number of slots of the multiple time intervals that are outside of the first set of slots.

At 1510, the UE may receive a set of downlink transmissions from the base station via the set of downlink resources. The operations of 1510 may be performed according to the methods described herein. In some examples, aspects of the operations of 1510 may be performed by an SPS reception component as described with reference to FIGS. 7 to 10.

At 1515, the UE may transmit a set of uplink transmissions to the base station via the set of uplink resources. The operations of 1515 may be performed according to the methods described herein. In some examples, aspects of the operations of 1515 may be performed by an SPS transmission component as described with reference to FIGS. 7 to 10.

Figure 16:
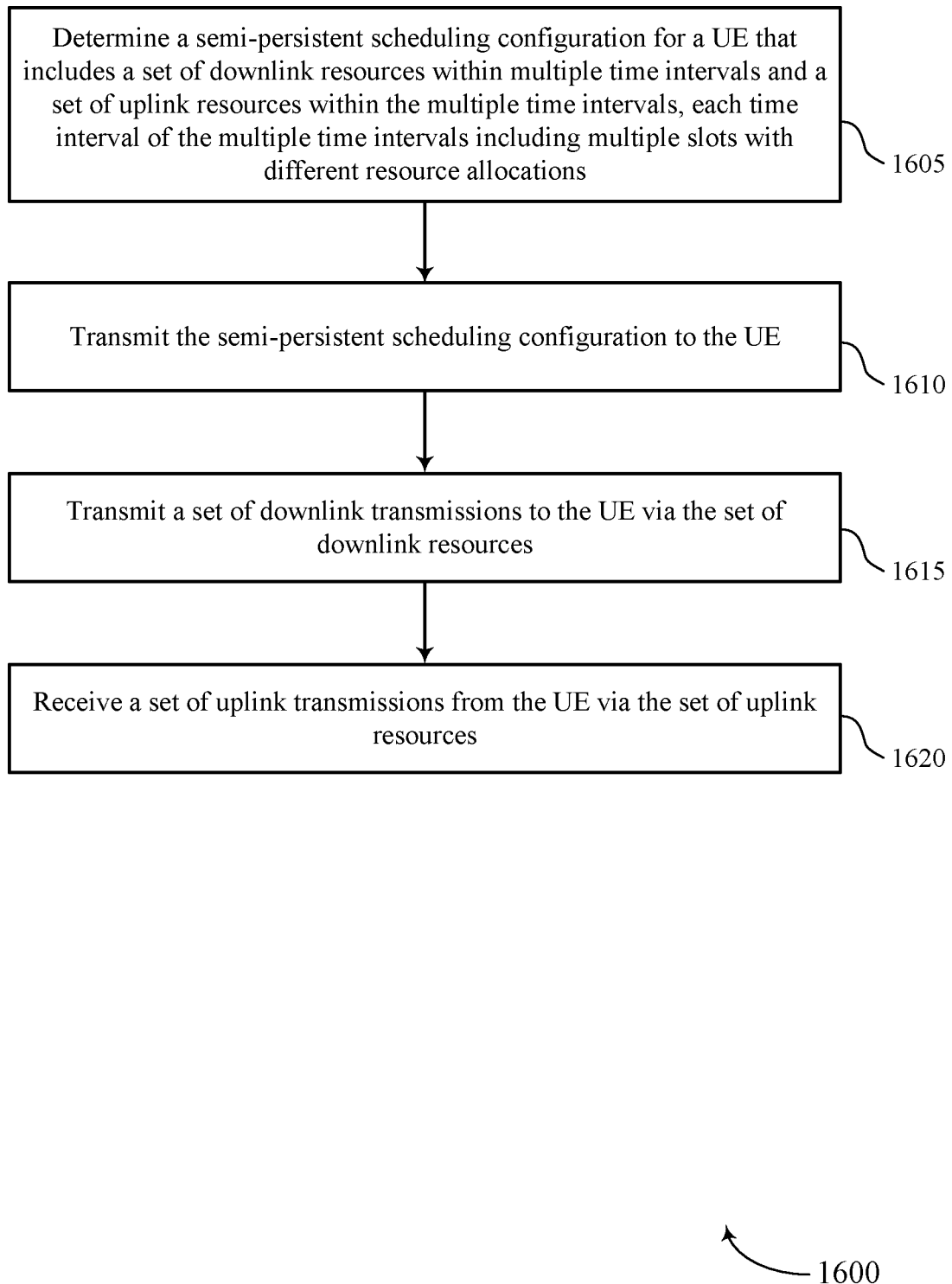

FIG. 16 shows a flowchart illustrating a method 1600 that supports evolved semi-persistent scheduling for wireless communications in accordance with aspects of the present disclosure. The operations of method 1600 may be implemented by a base station 105 or its components as described herein. For example, the operations of method 1600 may be performed by a communications manager as described with reference to FIGS. 11 to 14. In some examples, a base station may execute a set of instructions to control the functional elements of the base station to perform the functions described herein. Additionally or alternatively, a base station may perform aspects of the functions described herein using special-purpose hardware.

At 1605, the base station may determine a semi-persistent scheduling configuration for a UE that includes a set of downlink resources within multiple time intervals and a set of uplink resources within the multiple time intervals, each time interval of the multiple time intervals including multiple slots with different resource allocations. The operations of 1605 may be performed according to the methods described herein. In some examples, aspects of the operations of 1605 may be performed by an SPS configuration manager as described with reference to FIGS. 11 to 14. In some cases, the semi-persistent scheduling configuration further includes an ON-OFF duty cycle that spans a set of the multiple time intervals, an ON portion of the ON-OFF duty cycle including one or more uplink resources of the set of uplink resources, one or more downlink resources of the set of downlink resources, or combinations thereof. In some cases, the ON portion of the ON-OFF duty cycle spans a first set of slots, and an OFF portion of the ON-OFF duty cycle spans a second set of slots corresponding to a remaining number of slots of the multiple time intervals that are outside of the first set of slots.

At 1610, the base station may transmit the semi-persistent scheduling configuration to the UE. The operations of 1610 may be performed according to the methods described herein. In some examples, aspects of the operations of 1610 may be performed by an SPS configuration manager as described with reference to FIGS. 11 to 14.

At 1615, the base station may transmit a set of downlink transmissions to the UE via the set of downlink resources. The operations of 1615 may be performed according to the methods described herein. In some examples, aspects of the operations of 1615 may be performed by an SPS transmission component as described with reference to FIGS. 11 to 14.

At 1620, the base station may receive a set of uplink transmissions from the UE via the set of uplink resources. The operations of 1620 may be performed according to the methods described herein. In some examples, aspects of the operations of 1620 may be performed by an SPS reception component as described with reference to FIGS. 11 to 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    receiving, from a network device, a semi-persistent scheduling configuration associated with a single radio network temporary identifier, the semi-persistent scheduling configuration including a plurality of downlink resources within multiple time intervals and a plurality of uplink resources within the multiple time intervals, each time interval of the multiple time intervals comprising multiple slots with different resource allocations, wherein the semi-persistent scheduling configuration includes aggregation information for the multiple time intervals that indicates that the plurality of downlink resources and the plurality of uplink resources within each of the multiple time intervals repeat during a configured time period;
    receiving a plurality of downlink transmissions from the network device via the plurality of downlink resources; and
    transmitting a plurality of uplink transmissions to the network device via the plurality of uplink resources.

2. The method of claim 1, wherein the semi-persistent scheduling configuration further includes an ON-OFF duty cycle that spans a plurality of the multiple time intervals, an ON portion of the ON-OFF duty cycle comprising one or more uplink resources of the plurality of uplink resources, one or more downlink resources of the plurality of downlink resources, or combinations thereof.

3. The method of claim 2, wherein the ON portion of the ON-OFF duty cycle spans a first set of slots, and wherein an OFF portion of the ON-OFF duty cycle spans a second set of slots corresponding to a remaining number of slots of the multiple time intervals that are outside of the first set of slots.

4. The method of claim 1, wherein the semi-persistent scheduling configuration further includes a number of configured time periods during which the semi-persistent scheduling configuration applies.

5. The method of claim 4, wherein a duration of each configured time period is a product of a number of time intervals and a number of slots per time interval.

6. The method of claim 1, wherein each of the multiple time intervals correspond to scheduled traffic windows, and wherein each slot of the multiple slots is scheduled by a respective indicator selected from a set of indicators, the set of indicators comprising an indicator of uplink resources, an indicator of downlink resources, and an indicator of no resources, and wherein the aggregation information indicates that each respective indicator repeats during the configured time period.

7. The method of claim 6, wherein one or more of the multiple slots includes an unspecified resource allocation configured for subsequent scheduling.

8. The method of claim 7, wherein the one or more of the multiple slots that include the unspecified resource allocation are available for retransmissions.

9. The method of claim 1, wherein the plurality of uplink resources are used at least in part for transmission of sensor data in a factory automation network and the plurality of downlink resources are used at least in part for transmission of command information in the factory automation network.

10. The method of claim 1, wherein the plurality of uplink resources and the plurality of downlink resources are used for transmission of control information in a factory automation network.

11. A method for wireless communication, comprising:
  determining a semi-persistent scheduling configuration for a user equipment (UE) associated with a single radio network temporary identifier, the semi-persistent scheduling configuration including a plurality of downlink resources within multiple time intervals and a plurality of uplink resources within the multiple time intervals, each time interval of the multiple time intervals comprising multiple slots with different resource allocations, wherein the semi-persistent scheduling configuration includes aggregation information for the multiple time intervals that indicates that the plurality of downlink resources and the plurality of uplink resources within each of the multiple time intervals repeat during a configured time period;
  transmitting the semi-persistent scheduling configuration to the UE;
  transmitting a plurality of downlink transmissions to the UE via the plurality of downlink resources; and
  receiving a plurality of uplink transmissions from the UE via the plurality of uplink resources.

12. The method of claim 11, wherein the semi-persistent scheduling configuration further includes an ON-OFF duty cycle that spans a plurality of the multiple time intervals, an ON portion of the ON-OFF duty cycle comprising one or more uplink resources of the plurality of uplink resources, one or more downlink resources of the plurality of downlink resources, or combinations thereof.

13. The method of claim 12, wherein the ON portion of the ON-OFF duty cycle spans a first set of slots, and wherein an OFF portion of the ON-OFF duty cycle spans a second set of slots corresponding to a remaining number of slots of the multiple time intervals that are outside of the first set of slots.

14. The method of claim 11, wherein the semi-persistent scheduling configuration further includes a number of configured time periods during which the semi-persistent scheduling configuration applies.

15. The method of claim 14, wherein a duration of each configured time period is a product of a number of time intervals and a number of slots per time interval.

16. The method of claim 11, wherein each of the multiple time intervals correspond to scheduled traffic windows, and wherein each slot of the multiple slots is scheduled by a respective indicator selected from a set of indicators, the set of indicators comprising an indicator of uplink resources, an indicator of downlink resources, and an indicator of no resources, and wherein the aggregation information indicates that each respective indicator repeats during the configured time period.

17. The method of claim 16, wherein one or more of the multiple slots includes an unspecified resource allocation configured for subsequent scheduling.

18. The method of claim 17, wherein the one or more of the multiple slots that include the unspecified resource allocation are available for retransmissions.

19. The method of claim 11, wherein the plurality of uplink resources are used at least in part for transmission of sensor data in a factory automation network and the plurality of downlink resources are used at least in part for transmission of command information in the factory automation network.

20. The method of claim 11, wherein the plurality of uplink resources and the plurality of downlink resources are used for transmission of control information in a factory automation network.

21. An apparatus for wireless communication, comprising:
  a processor; and
  memory coupled with the processor, the memory comprising instructions executable by the processor to cause the apparatus to:
    receive, from a network device, a semi-persistent scheduling configuration associated with a single radio network temporary identifier, the semi-persistent scheduling configuration including a plurality of downlink resources within multiple time intervals and a plurality of uplink resources within the multiple time intervals, each time interval of the multiple time intervals comprising multiple slots with different resource allocations, wherein the semi-persistent scheduling configuration includes aggregation information for the multiple time intervals that indicates that the plurality of downlink resources and the plurality of uplink resources within each of the multiple time intervals repeat during a configured time period;
    receive a plurality of downlink transmissions from the network device via the plurality of downlink resources; and
    transmit a plurality of uplink transmissions to the network device via the plurality of uplink resources.

22. The apparatus of claim 21, wherein the semi-persistent scheduling configuration further includes an ON-OFF duty cycle that spans a plurality of the multiple time intervals, an ON portion of the ON-OFF duty cycle comprising one or more uplink resources of the plurality of uplink resources, one or more downlink resources of the plurality of downlink resources, or combinations thereof.

23. The apparatus of claim 22, wherein the ON portion of the ON-OFF duty cycle spans a first set of slots, and wherein an OFF portion of the ON-OFF duty cycle spans a second set of slots corresponding to a remaining number of slots of the multiple time intervals that are outside of the first set of slots.

24. The apparatus of claim 21, wherein the semi-persistent scheduling configuration further includes a number of configured time periods during which the semi-persistent scheduling configuration applies.

25. The apparatus of claim 21, wherein each of the multiple time intervals correspond to scheduled traffic windows, and wherein each slot of the multiple slots is scheduled by a respective indicator selected from a set of indicators, the set of indicators comprising an indicator of uplink resources, an indicator of downlink resources, and an indicator of no resources, and wherein the aggregation information indicates that each respective indicator repeats during the configured time period.

26. An apparatus for wireless communication, comprising:
   a processor; and
   memory coupled with the processor, the memory comprising instructions executable by the processor to cause the apparatus to:
      determine a semi-persistent scheduling configuration for a user equipment (UE) associated with a single radio network temporary identifier, the semi-persistent scheduling configuration including a plurality of downlink resources within multiple time intervals and a plurality of uplink resources within the multiple time intervals, each time interval of the multiple time intervals comprising multiple slots with different resource allocations, wherein the semi-persistent scheduling configuration includes aggregation information for the multiple time intervals that indicates that the plurality of downlink resources and the plurality of uplink resources within each of the multiple time intervals repeat during a configured time period;
      transmit the semi-persistent scheduling configuration to the UE;
      transmit a plurality of downlink transmissions to the UE via the plurality of downlink resources; and
      receive a plurality of uplink transmissions from the UE via the plurality of uplink resources.

27. The apparatus of claim 26, wherein the semi-persistent scheduling configuration further includes an ON-OFF duty cycle that spans a plurality of the multiple time intervals, an ON portion of the ON-OFF duty cycle comprising one or more uplink resources of the plurality of uplink resources, one or more downlink resources of the plurality of downlink resources, or combinations thereof.

28. The apparatus of claim 26, wherein the semi-persistent scheduling configuration further includes a number of configured time periods during which the semi-persistent scheduling configuration applies.

29. The apparatus of claim 27, wherein the ON portion of the ON-OFF duty cycle spans a first set of slots, and wherein an OFF portion of the ON-OFF duty cycle spans a second set of slots corresponding to a remaining number of slots of the multiple time intervals that are outside of the first set of slots.

30. The apparatus of claim 26, wherein the semi-persistent scheduling configuration further includes a number of configured time periods during which the semi-persistent scheduling configuration applies.

* * * * *